(12) United States Patent
Ding et al.

(10) Patent No.: US 11,440,198 B2
(45) Date of Patent: Sep. 13, 2022

(54) CONTROL SYSTEM AND METHOD FOR MOVEMENT OF NECK MECHANISM FOR ROBOT

(71) Applicant: UBTECH ROBOTICS CORP LTD, Shenzhen (CN)

(72) Inventors: Houzhu Ding, Pasadena, CA (US); Mohammad Iman Mokhlespour Esfahani, Pasadena, CA (US); Chengkun Zhang, Pasadena, CA (US); Huan Tan, Pasadena, CA (US); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 220 days.

(21) Appl. No.: 16/861,200

(22) Filed: Apr. 28, 2020

(65) Prior Publication Data
US 2021/0331323 A1    Oct. 28, 2021

(51) Int. Cl.
| | | |
|---|---|---|
| *B25J 9/16* | (2006.01) | |
| *B25J 9/12* | (2006.01) | |
| *B25J 13/08* | (2006.01) | |
| *B25J 19/04* | (2006.01) | |
| *B25J 11/00* | (2006.01) | |
| *B25J 19/00* | (2006.01) | |

(52) U.S. Cl.
CPC ............ *B25J 9/1697* (2013.01); *B25J 9/123* (2013.01); *B25J 9/126* (2013.01); *B25J 9/161* (2013.01); *B25J 9/1684* (2013.01); *B25J 13/08* (2013.01); *B25J 19/04* (2013.01); *B25J 11/0005* (2013.01); *B25J 11/009* (2013.01); *B25J 19/0016* (2013.01)

(58) Field of Classification Search
CPC ... B25J 9/123; B25J 9/126; B25J 9/161; B25J 9/1684; B25J 9/1697; B25J 11/0005; B25J 11/0009; B25J 13/08; B25J 19/0016; B25J 19/04
See application file for complete search history.

(56) References Cited

U.S. PATENT DOCUMENTS

| | | | | |
|---|---|---|---|---|
| 2011/0071675 | A1* | 3/2011 | Wells | H04N 5/332 700/250 |
| 2011/0147103 | A1* | 6/2011 | Alfayad | B25J 17/0283 180/8.5 |
| 2017/0274525 | A1* | 9/2017 | Nagatsuka | B25J 9/0015 |
| 2020/0406468 | A1* | 12/2020 | Stoianovici | B25J 9/0003 |

(Continued)

FOREIGN PATENT DOCUMENTS

CN    103831628    6/2014

OTHER PUBLICATIONS

ISR for PCT/CN2021/090703.
Written opinions of ISA for PCT/CN2021/090703.

*Primary Examiner* — Dale Moyer

(57) ABSTRACT

A control system for a neck mechanism includes a perception system configured to track movement of an object, and a perception control system that controls a rotary motor to yaw a platform and controls a first linear actuator and a second linear actuator that is in parallel with the first linear actuator to pitch and roll the platform according to a target position of the platform. The perception system tracks movement of the object by estimating its position and pose in 3D space and the platform is moved according to a vision-based position and pose estimation result.

20 Claims, 22 Drawing Sheets

(56) References Cited

U.S. PATENT DOCUMENTS

2021/0031361 A1*  2/2021  Morey ................... B25J 19/027
2021/0178576 A1*  6/2021  Murphy ............. G05B 13/0265
2021/0286353 A1*  9/2021  Takenaka ............. G05D 1/0016

* cited by examiner

CONTROL SYSTEM AND METHOD FOR MOVEMENT OF NECK MECHANISM FOR ROBOT

CROSS REFERENCE TO RELATED APPLICATION

This application is related to U.S. patent application Ser. No. 16/861,201, titled "Neck Mechanism for Robot", and filed on Apr. 28, 2020. The application is incorporated by reference herein in its entirety.

TECHNICAL FIELD

The present disclosure relates to a field of a neck mechanism for a robot, in particular to a control system and a method for a neck mechanism of a robot capable of simulating a human neck movement.

BACKGROUND

The huge increase in the global elderly population is accompanied by problems, such as the decreasing number of health professionals and the economic challenges of medical treatment. Recent advances in robotics provide an innovative solution to alleviate these challenges by improving elderly quality of life and prioritizing their dignity and independence. As such, healthcare robots have attracted significant attention in recent years. By providing assistance in tasks, such as monitoring and tracking elderly health, and performing repetitive tasks, the healthcare robots are capable of serving both health professionals and the elderly.

More human-like robots are able to gain more acceptance in healthcare facilities, such as hospitals, and one essential part of making a human-like robot for hospitals is a neck mechanism for a head. Humanoid robots, with the capability of mimicking human actions and behaviors, include the expression of feelings to facilitate the establishment of trust and connection between the older individuals and the robots. Generally, most neck mechanisms for robots can be categorized into two groups: serial or parallel.

A serial neck mechanism is a chain-based structure. Specifically, the serial neck mechanism usually includes a motor and transmission structures connected in series with the motor. However, many serial neck mechanisms are limited to just two degrees of freedom, which employ a simple structure, low cost, and easy kinematic analysis—the mathematical model for multi-degrees of freedom for rigid bodies connected by joints. More complicated serial neck mechanisms can do three or more degrees of freedom, but because of the serial connection structure of all serial neck mechanisms, movement is achieved by the transmission structures driving each other, resulting in a relatively high inertia of the transmission structures. Low load capacity and low rigidity are also serious issues affecting serial neck mechanisms, especially in the healthcare environment where load can be an issue (e.g., elderly people may lean on the robot or put hands on the robot head).

A parallel neck mechanism generally includes a fixed base, a movable platform, multiple motors arranged on the fixed base, and multiple actuators connected to the multiple motors. In this structure, the multiple actuators are connected to the movable platform and arranged in parallel between the fixed base and the movable platform. Because the multiple actuators are connected in parallel, the multiple actuators drive the movable platform to realize multiple degrees of freedom (including but not limited to pitch, roll, yaw) and have a better representation of neck movements. However, due to the parallel structure of the multiple actuators, it is extremely difficult to avoid mutual interference in the movement between the multiple actuators, and extremely complicated to perform forward and inverse kinematic analysis of parallel neck mechanisms. In addition, on top of the hardware and software limitations, analysis, control and human-robot interaction (HRI) applications is still a challenging part for parallel neck mechanisms because of the mechanical, control, perception integration that should be specifically designed and tested for this type of neck mechanism.

Accordingly, there is a need to provide a neck mechanism to overcome the above-mentioned problems.

DETAILED DESCRIPTION

Figure 1A:
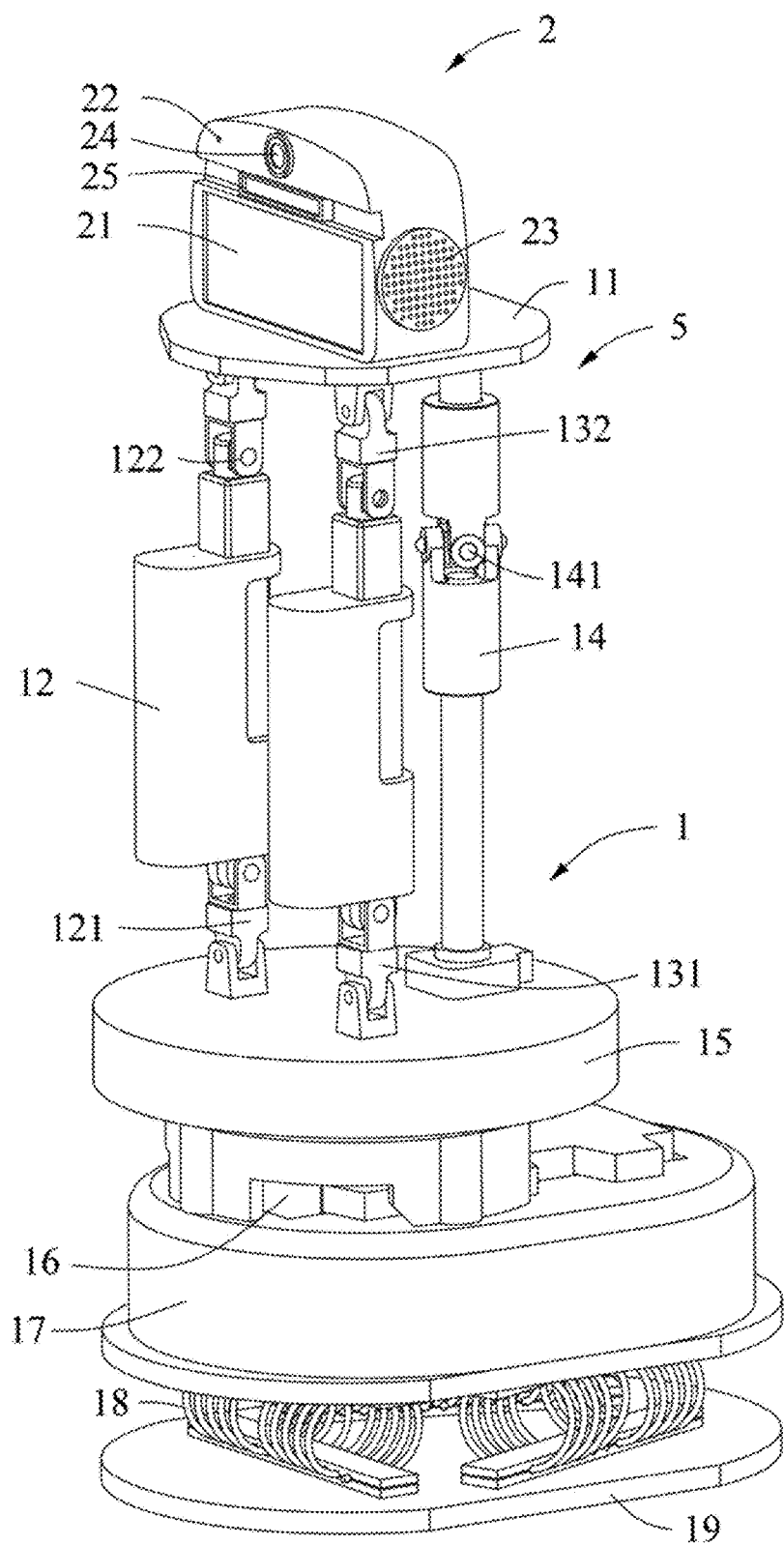
FIG. 1A is a perspective view of a neck mechanism for a robot according to one embodiment of the present disclosure.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

Figure 1B:
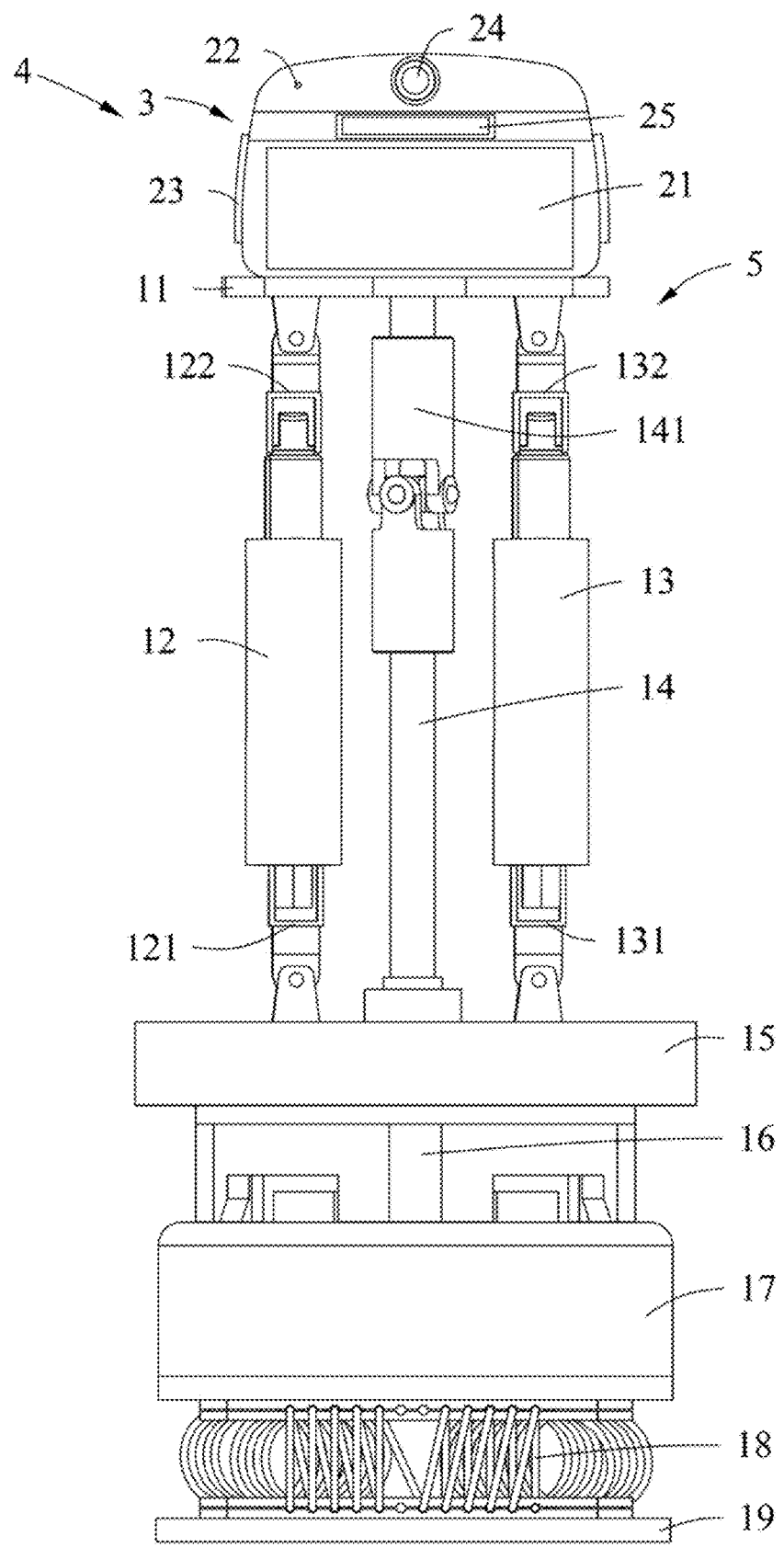
FIG. 1B is a front view of the neck mechanism according to one embodiment of the present disclosure.
Figure 1C:
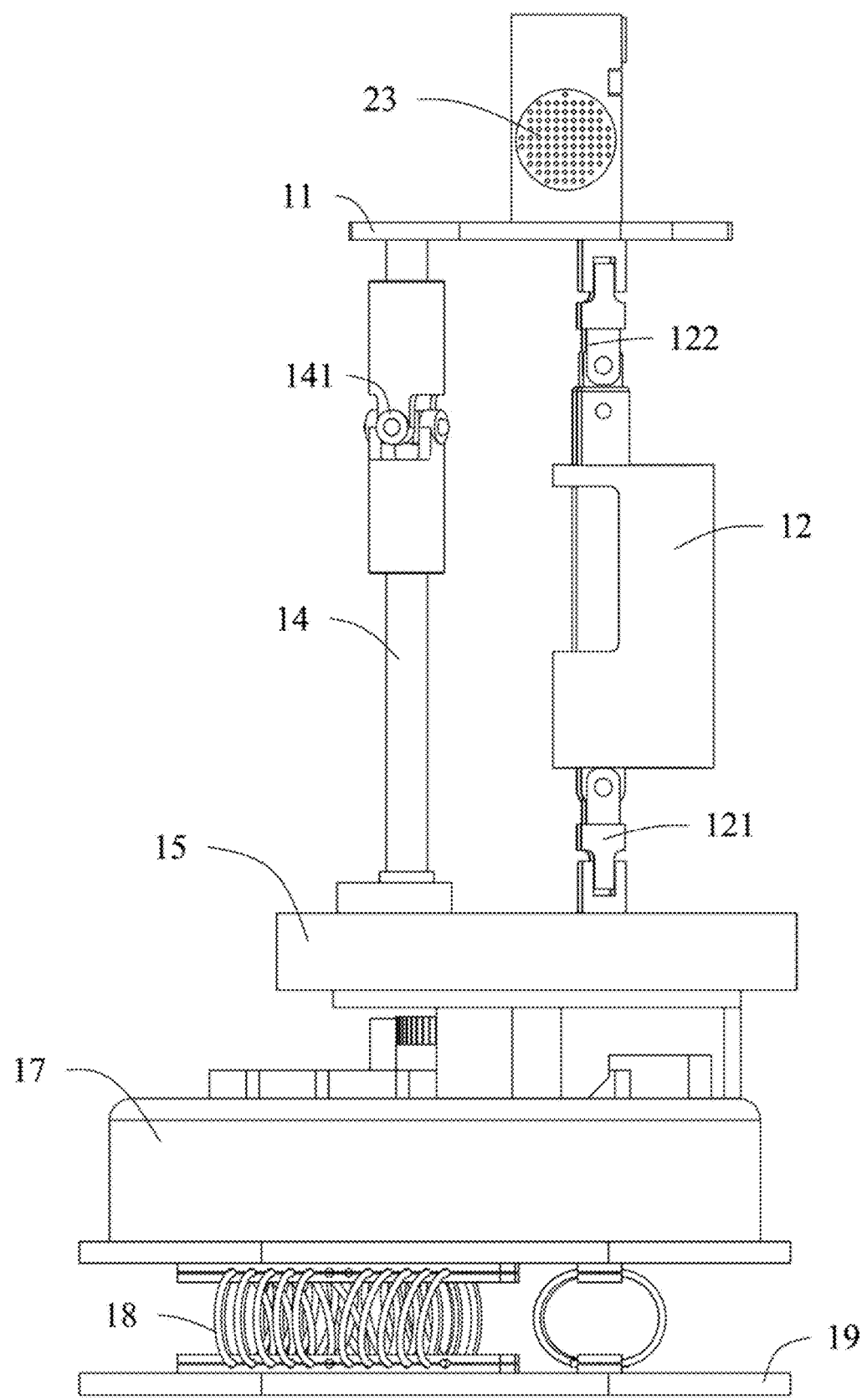
FIG. 1C is a side view of the neck mechanism according to one embodiment of the present disclosure.

FIG. 1A depicts a perspective view, FIG. 1B depicts a front view and FIG. 1C depicts a left side view of a neck mechanism 1 for a robot 2 that has at least 3 degrees of freedom (DOF: pitch, roll, yaw degrees of freedom) to fulfill rotational movements and capable of representing neck movements to improve personification of a head 3 of the robot 2. The present disclosure provides a neck mechanism for the robot 2 that takes advantage of both serial and parallel neck mechanisms, while using one servo and two linear actuators to realize three degrees of freedom (pitch, roll, yaw) while maintaining simplicity of the structure to facilitate kinematic analysis and reduce costs (less rotary joint required, which is costly during fabrication). The neck mechanism 1 for the robot 2 can be used to make the robot 2 have more anthropomorphic features for broader human-robot interaction (HRI) applications.

In one embodiment, the neck mechanism 1 includes a first linear actuator 12, a second linear actuator 13 positioned in parallel with the first linear actuator 12, a support shaft 14 positioned behind and between the first linear actuator 12 and the second linear actuator 13, a rotary stage 15 positioned between an upper platform 11 and a lower platform 17, a rotary motor (e.g., a servo) 16 mounted on the lower platform 17, a perception system 4, and a perception control system 5 ("control system 5"). In response to receiving command instructions, the control system 5 controls movement of the rotary stage 15, the first linear actuator 12, the second linear actuator 13, and/or other mechanical or software aspects of the neck mechanism 1. In one embodiment, the rotary motor 16 can be a RC servo motor, however, the present disclosure is not limited thereto.

The upper platform 11 may be used as a platform to mount or attach various mechanical aspects of the neck mechanism 1, such as the head 3 of the robot 2, for example. In one embodiment, the head 3 may include a display screen 21 that can display input/output information to convey information to healthcare professionals, patients, family, and friends. Depending on the embodiment, shape of the head 3 may be rectangular, square, circular, triangular, or any combinations thereof. The display screen 21 may be used to display medical information or in other embodiments, building plans, circuit designs, and/or mapping information, should the robot be used in a tourist center, for example. However, the disclosure is not limited thereto. In one embodiment, the display screen 21 may display animated eyes to convey emotions or human expressions to users. This allows for realistic communication between humans and the robot 2.

The lower platform 17 may be used as a platform for the rotary motor 16 to rotate the rotary stage 15. Additionally, in one embodiment, the lower platform 17 may be used for disposing circuit boards, sensors, or other mechanical and/or electrical systems for the neck mechanism 1.

In one embodiment, the first linear actuator 12 and the second linear actuator 13 are both connected between the upper platform 11 and the rotary stage 15 via joints. As shown in FIGS. 1A-1C, the first linear actuator 11 includes a first joint 121 and a second joint 122 at distal and opposite ends, respectively of the first linear actuator 12. The first joint 121 is connected with the rotary stage 15 and the second joint 122 is connected with the upper platform 11. The second linear actuator 13 includes a third joint 131 and a fourth joint 132 at distal and opposite ends, respectively of the second linear actuator 13. The third joint 131 is connected with the rotary stage 15 and the fourth joint 132 is connected with the upper platform 11. Thus, the first linear actuator 12 and the second linear actuator 13 are connected with the upper platform 11 and the rotary stage 15, respectively, to allow the first linear actuator 12 and the second linear actuator 13 to move. Shafts (i.e., strokes) of the first linear actuator 12 and the second linear actuator 13 are configured to go up and down (i.e., extend and retract) to adjust lengths of the first linear actuator 12 and the second linear actuator 13, as will be further explained below. Embodiments of the present disclosure may use the words "shaft" and "stroke" interchangeably as it relates to extension and retraction of the linear actuators. It should be understood that "stroke length" is the difference between an open and closed position for a linear actuator.

It should be known that a joint is a coupling that connects rigid rods having axes that are inclined to each other. In one embodiment, the joint may be a ball joint or a universal joint. Universal joints are commonly used in shafts that transmit rotary motion. In one embodiment, a universal joint consists of a pair of hinges located close together, oriented at an angle (e.g., 90°) to each other, and connected by a cross shaft.

The support shaft 14 supports load of the upper platform 11 and is positioned behind (or in front) and between the first linear actuator 12 and the second linear actuator 13. In one embodiment, the support shaft 14 is positioned in the middle of the first linear actuator 12 and the second linear actuator 13 and is diagonally interposed behind and between the first linear actuator 12 and the second linear actuator 13. The support shaft 14 includes a fifth joint 141 that allows a shaft of the support shaft 14 to rotate in various directions. The fifth joint 141 allows the shaft of the support shaft 14 to adjust a rotation angle along with the first linear actuator 12 and the second linear actuator 13. Angle of the support shaft 14 between the first linear actuator 12 and the second linear actuator 13, as it may be appreciated by one of ordinary skill in the art, will differ according to load and placement of components on the upper platform 11. In one embodiment, the display screen 21 can be considered as being in front of the linear actuators 12, 13, while behind the display screen 21 can be considered as being behind the linear actuators 12, 13.

In one embodiment, a speaker 23 and a microphone 22 may be disposed, such as being adjacent to the display screen 21. The speaker 23 may be used to convey audible information to the healthcare professionals, patients, family, and friends, such as pill dosage information or directions to the bathroom. For example, the speaker 23, in one example, may be disposed on two sides of the head 3, to personify ears of a human. The microphone 22 may be used as a one-way or two-way communication between doctors and nurses to patients and family. In one embodiment, family and friends may use the microphone 22 to leave greetings to the patient for when they are not physically in the same room as the patient. In another embodiment, nurses may use the microphone 22 to remind patients when to take their medicine.

The rotary stage 15 is positioned between the upper platform 11 and the lower platform 17 and is connected with the rotary motor 16, so as to rotate under control of the rotary motor 16 to rotate the upper platform 11. The rotary stage 15 consists of a platform and a base, joined by some form of guide in such a way that the platform is restricted to rotation about a single axis with respect to the base. Different bearings, such as plain bearing, sleeve bearing or rolling-element bearings may be used, depending on the embodiment. Further description of the rotary stage 15 is provided below.

A damping mechanism 18 may be disposed below the lower platform 17 to reduce and restrict height of oscillations, due to movement of the head 3 and/or neck mechanism 1 on the body of the robot 2. As shown in FIGS. 1A-1C, the damping mechanism 1 may include three horizontally mounted springs, but the disclosure is not limited thereto. In one embodiment, the damping mechanism 18 may be disposed on a base 19. Additionally, the base 19 may be used as a mechanical connection point to attach the neck mechanism 1 to a body of a robot 2, for example. Movement of the neck mechanism 1 on the body of the robot 2 allows for the robot 2 to have anthropomorphic features.

In order to achieve anthropomorphic movement of the neck mechanism 1 for the robot 2, a range of motion of the neck mechanism 1 for the robot 2 should also be close to a range of motion of the human cervical spine.

Specific terminology related to rotation and movement of the neck mechanism 1 can be defined according to yaw, pitch, and roll angles. It should be understood that "yaw" can be defined as left or right movement about an axis running up and down, "pitch" can be defined as up or down movement about an axis running from side to side, and "roll" can be defined as rotation about an axis running from front to back. The axes can be alternatively designated as vertical, transverse, and longitudinal, respectively.

Figure 2C:
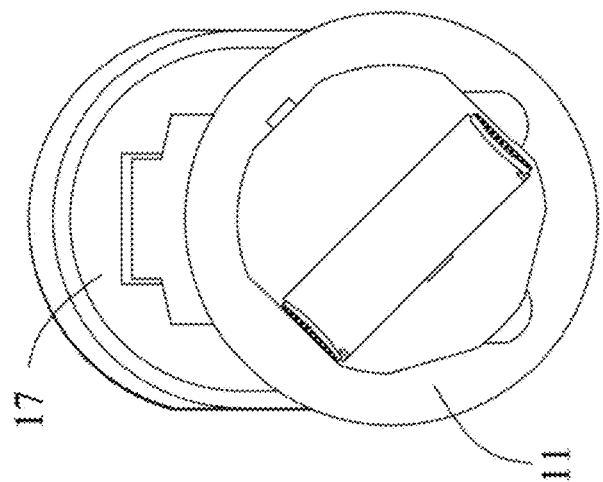
FIG. 2C is a top view of the neck mechanism according to one embodiment of the present disclosure where the yaw angle of the upper platform is −45 degrees.
Figure 2B:
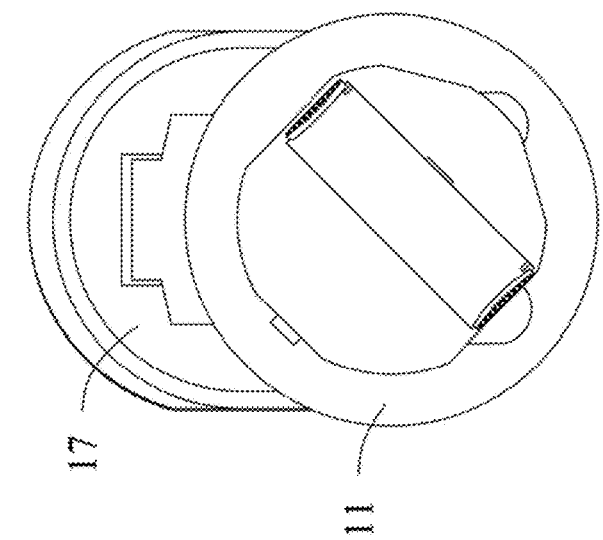
FIG. 2B is a top view of the neck mechanism according to one embodiment of the present disclosure where the yaw angle of the upper platform is 45 degrees.
Figure 2A:
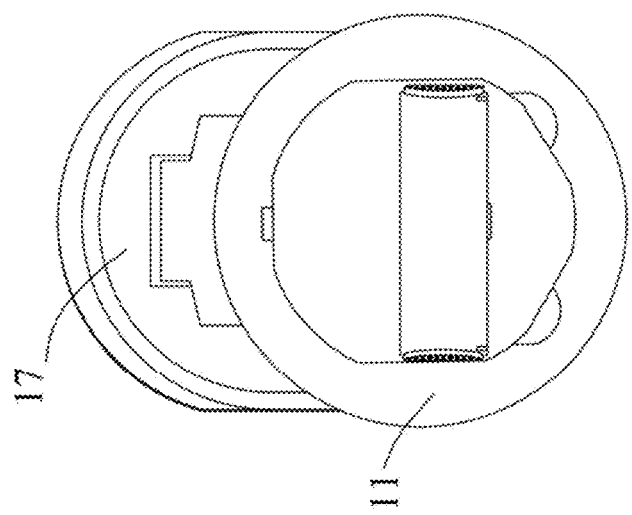
FIG. 2A is a top view of the neck mechanism according to one embodiment of the present disclosure where a yaw angle of an upper platform is 0 degrees.

FIGS. 2A-2C are schematic diagrams showing specific angles of the neck mechanism 1 on a yaw axis. In one embodiment, the rotary motor 16 is capable of rotating in a range of 0-180 degrees (−90 to 90 degrees in this embodiment) and the rotary motor 16 is configured to control the yaw angle and rotation speed of the rotary stage 15 independently. The rotary stage 15 is configured to rotate the upper platform 11 accordingly, thereby realizing yaw DOF of the neck mechanism 1 of the robot 2. Specifically, as shown in FIG. 2A, when the rotary motor 16 is at rest or rotates the rotary stage 0 degrees (e.g., a default position), the yaw angle of the upper platform 11 is 0 degrees. As shown in FIG. 2B, the rotary motor 16 drives the rotary stage 15 to rotate 45 degrees, thereby synchronously driving the upper platform 11 to rotate 45 degrees. And as shown in FIG. 2C, the rotary motor 16 drives the rotary stage 15 to rotate −45 degrees, thereby synchronously driving the upper platform 11 to rotate −45 degrees. Since the yaw motion of the neck mechanism 1 is driven by the rotary motor 16 independently, which is easy to isolate and control, forward and inverse kinematic analysis of the neck mechanism primarily focuses on the pitch and roll DOFs controlled by the first linear actuator 12, the second linear actuator 13, and the support shaft 14, which will be explained below.

Figure 3A:
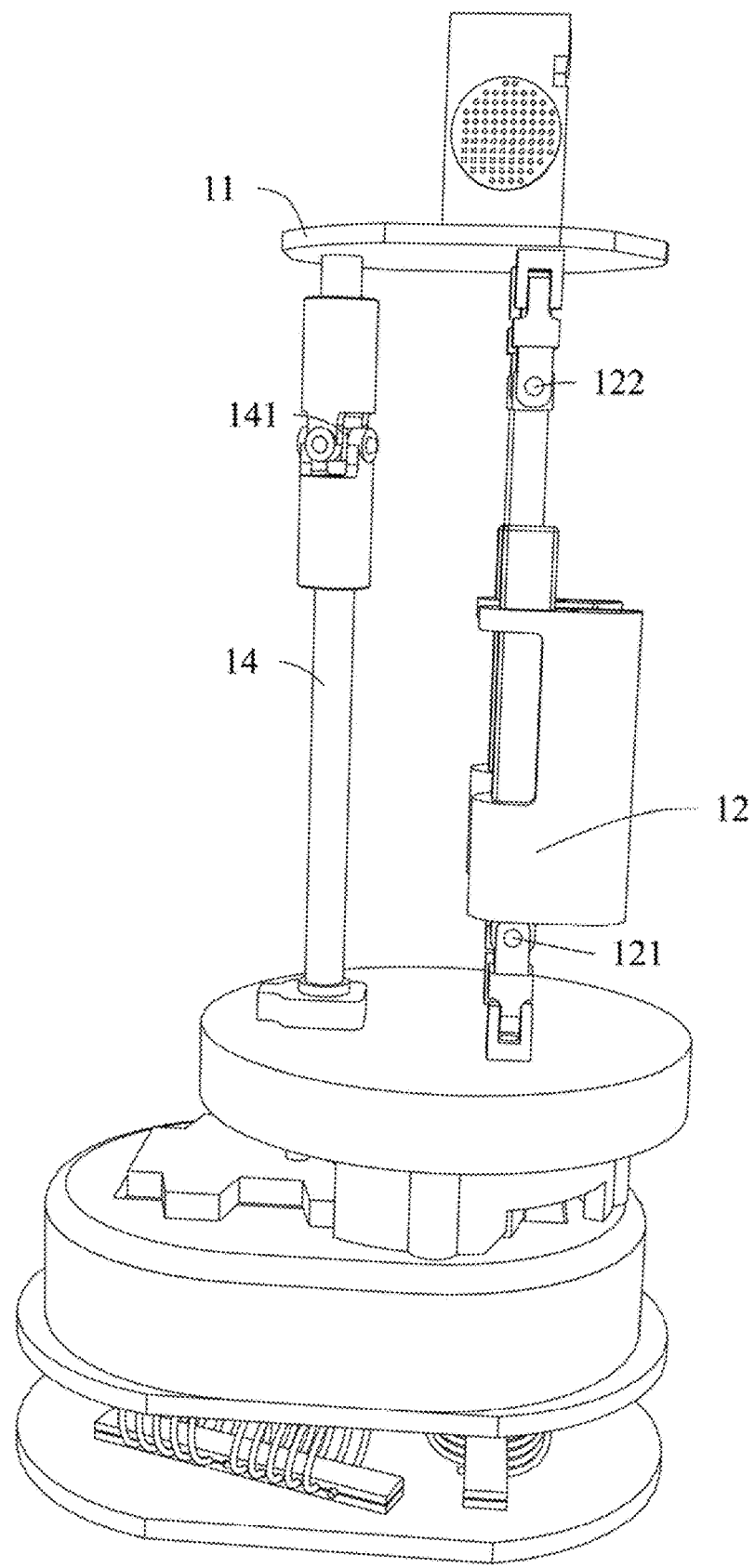
FIG. 3A is a side view of the neck mechanism according to one embodiment of the present disclosure where a pitch angle of the upper platform is 0 degrees.
Figure 3B:
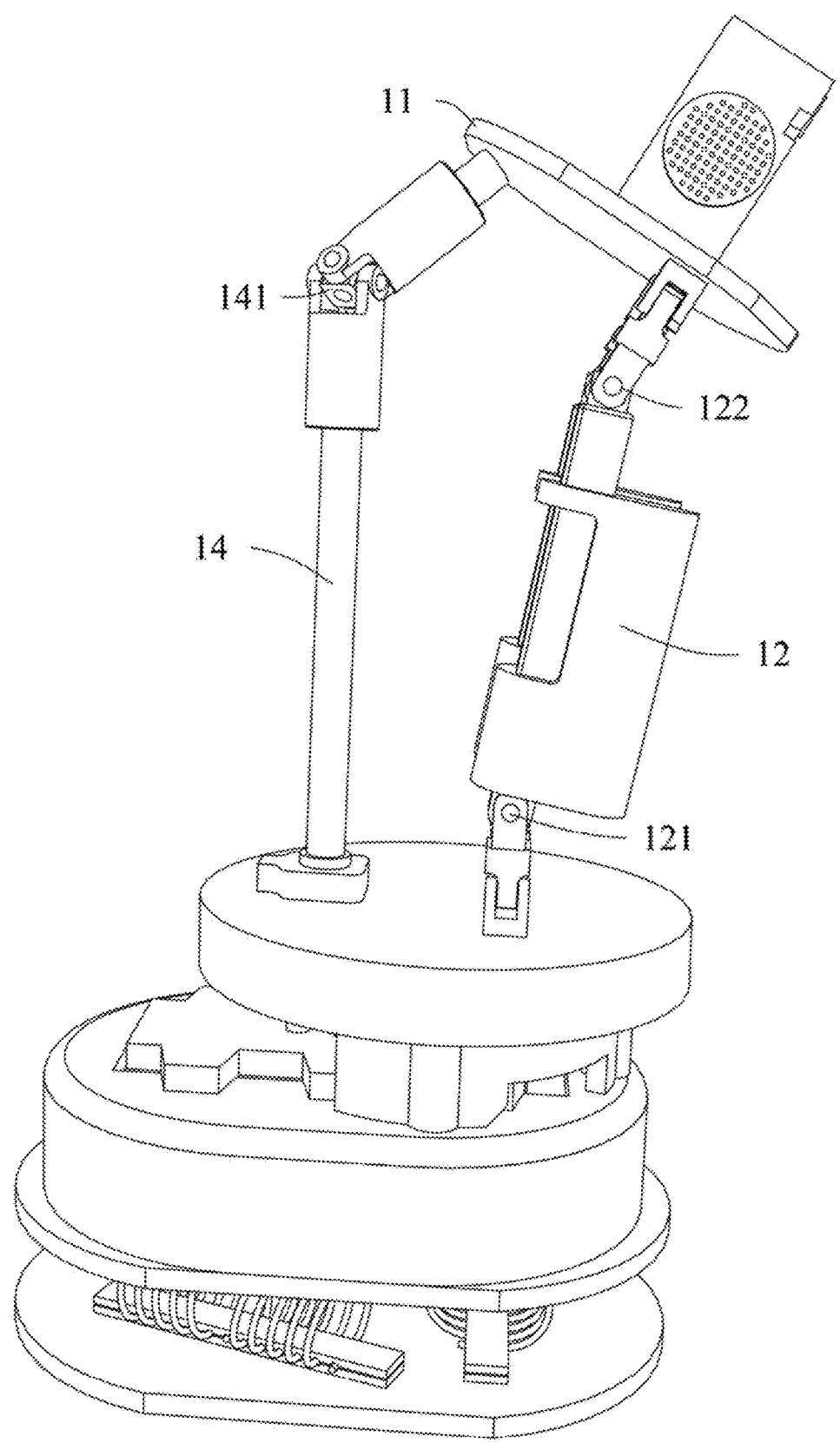
FIG. 3B is a side view of the neck mechanism according to one embodiment of the present disclosure where the pitch angle of the upper platform is 30 degrees.
Figure 3C:
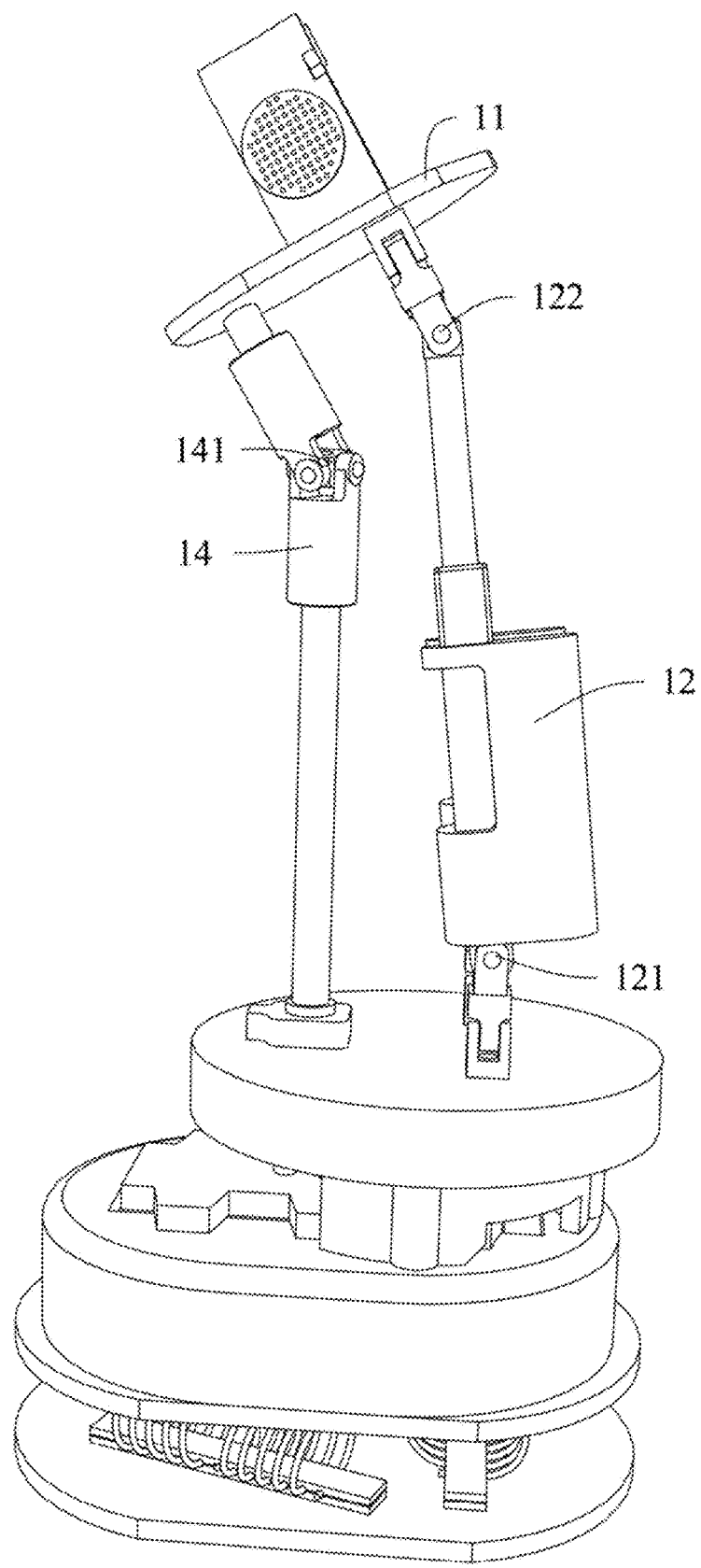
FIG. 3C is a side view of the neck mechanism according to one embodiment of the present disclosure where the pitch angle of the upper platform is −30 degrees.

FIGS. 3A-3C are schematic diagrams showing specific angles of the neck mechanism 1 on a pitch axis. In one embodiment, the first linear actuator 12 and the second linear actuator 13 are both controlled to have a same length that is shorter or longer than the support shaft 14, and the second joint 122 and the fourth joint 132 are controlled to move together, at a same angle, to pitch the upper platform 11 to realize a pitch DOF of the neck mechanism 1 for the robot 2. Specifically, as shown in FIG. 3A, the pitch angle of the neck mechanism 1 is 0 degrees and the first linear actuator 12 and the second linear actuator are in a default position. In the embodiment, the first linear actuator 12 and the second linear actuator 13 are controlled to extend, respectively, for half of a stroke length of the first linear actuator 12 (e.g., half of the length of the shaft of the first linear actuator) and half of a stroke length of the second linear actuator (e.g., half of the length of the shaft of the second linear actuator) to have a same height (i.e., same length) as the support shaft 14, and therefore, the pitch angle of the upper platform 11 is 0 degrees. In this example, the head 3 appears to be looking forward. As shown in FIG. 3B, the pitch angle of the neck mechanism 1 is −30 degrees. In the embodiment, the shaft of the first linear actuator 12 and the shaft of the second linear actuator 13 are controlled to retract at a same speed, with respect to the default position, so that the first linear actuator 12 and the second linear actuator 13 have a same length that is lower (i.e., shorter) than the support shaft 14. In this example, the head 3 appears to be looking downward. As shown in FIG. 3C, the pitch angle of the neck mechanism for the robot is 30 degrees. In the embodiment, the shaft of the first linear actuator 12 and the shaft of the second linear actuator 13 are controlled to extend together at a same speed with respect to the default position, so that the first linear actuator 12 and the second linear actuator 13 have a same length that is higher (i.e., longer) than the support shaft 14. In this example, the head 3 appears to be looking upward. It should be appreciated that these angles are merely exemplary and greater or lesser angles may be used for anthropomorphic movement.

In order to calculate the functional relationship between the pitch angle of the upper platform 11, the present disclosure provides a forward kinematics analytical model for the neck mechanism 1 on the pitch axis.

Figure 3D:
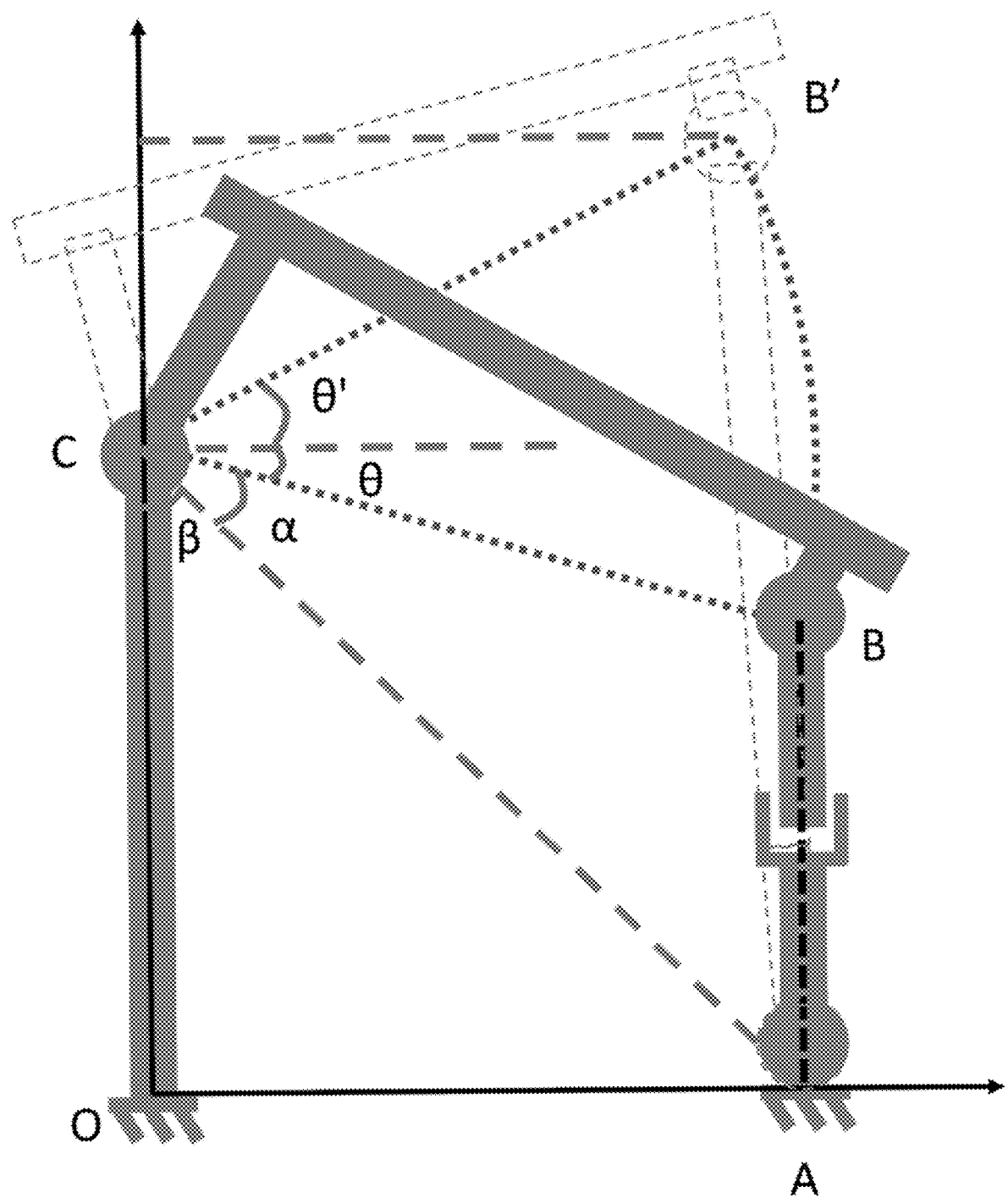
FIG. 3D is an analytical model of the neck mechanism in a pitch axis.

FIG. 3D is a pitch analytical model, which is a 2D projection of part of the neck mechanism 1 for the robot 2 in a side view showing the relationship of the support shaft 14 and the first linear actuator 12, and the second linear actuator 13. In this embodiment, the first linear actuator 12 and the second actuator 13 have the same length and extend or retract synchronously, such that a projection of the first linear actuator 12 overlaps a projection of the second linear actuator 13 from the side view. As shown in FIG. 3D, only the first linear actuator 12 and the support shaft 14 are labeled. It should be understood that the second linear actuator 13 is identical to the first linear actuator 12 and symmetrical with respect to the support shaft 14, therefore, a relationship between the support shaft 14 and the first linear actuator 12 is same as a relationship between the support shaft 14 and the second linear actuator 13 in the pitch analytical model.

As shown in FIG. 3D, $l_{OC}$ represents a length of an axis of the fifth joint 141 of the support shaft 14 to the rotary stage 15 in the 2D projection, $l_{OA}$ represents a horizontal distance between the support shaft 14 and the first linear actuator 12 in the 2D projection. $l_{CA}$ is a distance from the axis of the fifth joint 141 to an axis of the second joint 122 or an axis of the fourth joint 132 in the 2D projection. AB represents a distance from the axis of the second joint 122 or the axis of the fourth joint 132 to the rotary stage 15 in the 2D projection. $l_{CB}$ represents a distance from the axis of the fifth joint 141 to the axis of second joint 122 or the axis of the fourth joint 132 in the 2D projection. In the pitch analytical model, $l_{OC}$ is perpendicular to $l_{OA}$ such that $l_{CA}$ is calculated by $l_{OC}$ and $l_{OA}$:

$$l_{CA}=\sqrt{l_{OC}^2+l_{OA}^2}$$

$\beta$ represents an angle between $l_{OC}$ and $l_{CA}$, and the $\beta$ is calculated by following formula:

$$\beta=a\tan 2(l_{OA},l_{OC})$$

$\alpha$ represents an angle between $l_{CA}$ and $l_{CB}$, as $\alpha$ is related to related to the $l_{CB}$, $l_{CA}$, and $l_{AB}$, $\alpha$ is calculated by following formula:

$$\alpha = \cos^{-1}\left(\frac{l_{CB}^2 + l_{CA}^2 - l_{AB}^2}{2l_{CB}*CA}\right)$$

$\theta$ represents the pitch angle of the neck mechanism 1 for the robot 2, and $\theta$ is calculated as following:

$$\theta = \alpha + \beta - \frac{\pi}{2}$$

Combining the computation formulas of $\alpha$ and $\beta$, $$\theta = \cos^{-1}\left(\frac{l_{CB}^2 + l_{CA}^2 - l_{AB}^2}{2l_{CB}*l_{CA}}\right) + a\tan 2(l_{OA}, l_{OC}) - \frac{\pi}{2}$$

As can be seen from the equation above, the value of $\theta$ is easy to derive from a mathematical point of view and also computationally easy and fast to compute using low-cost processors. This reduces costs.

Figure 4A:
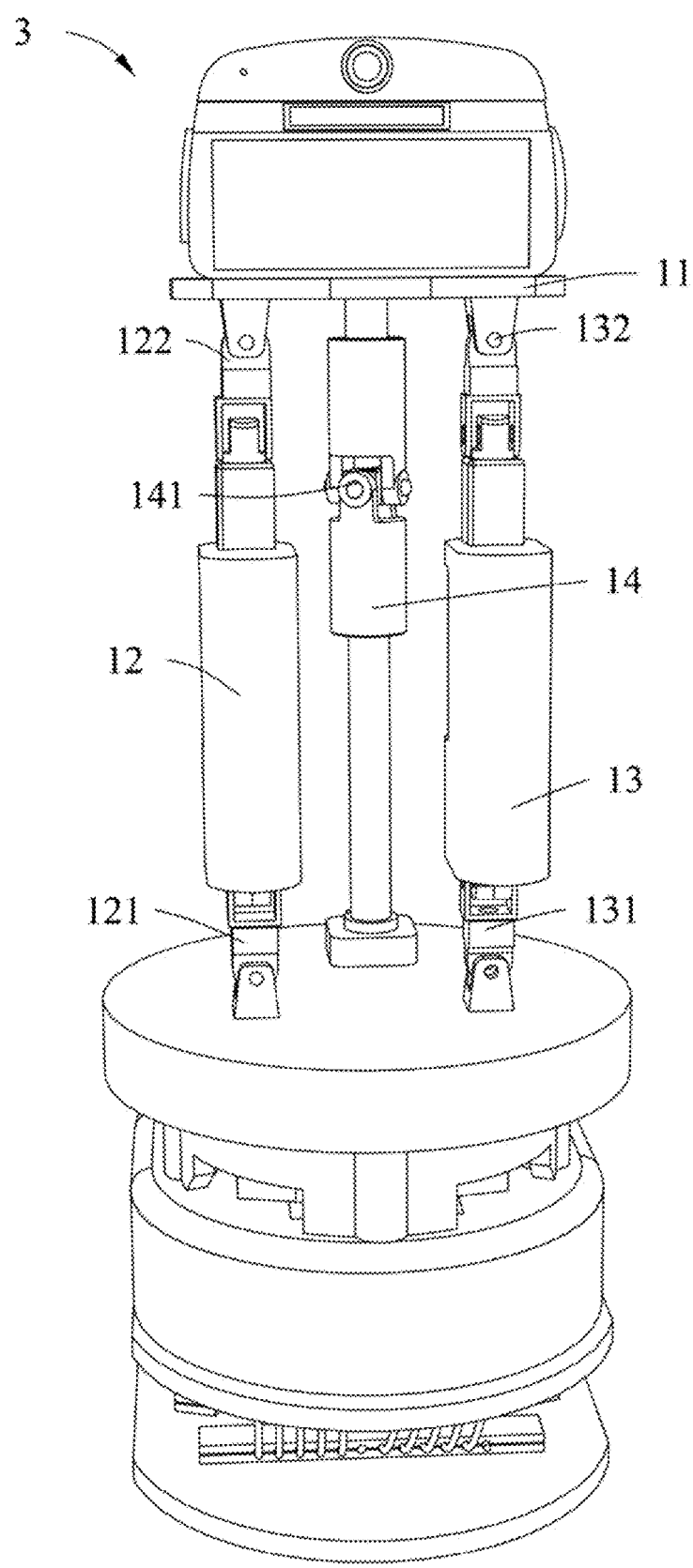
FIG. 4A is a front view of the neck mechanism according to one embodiment of the present disclosure where a roll angle of the upper platform is 0 degrees.
Figure 4B:
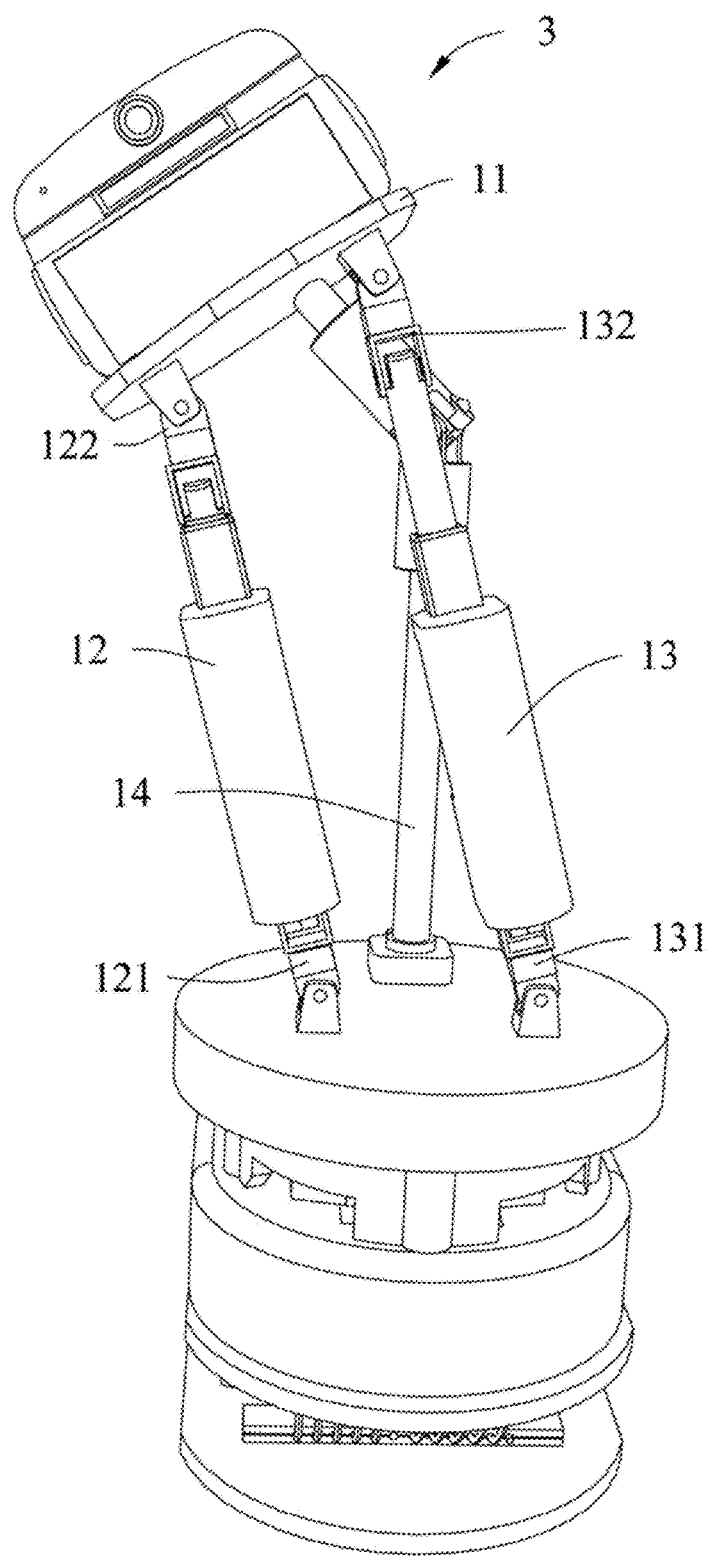
FIG. 4B is a front view of the neck mechanism according to one embodiment of the present disclosure where the roll angle of the upper platform is 50 degrees.
Figure 4C:
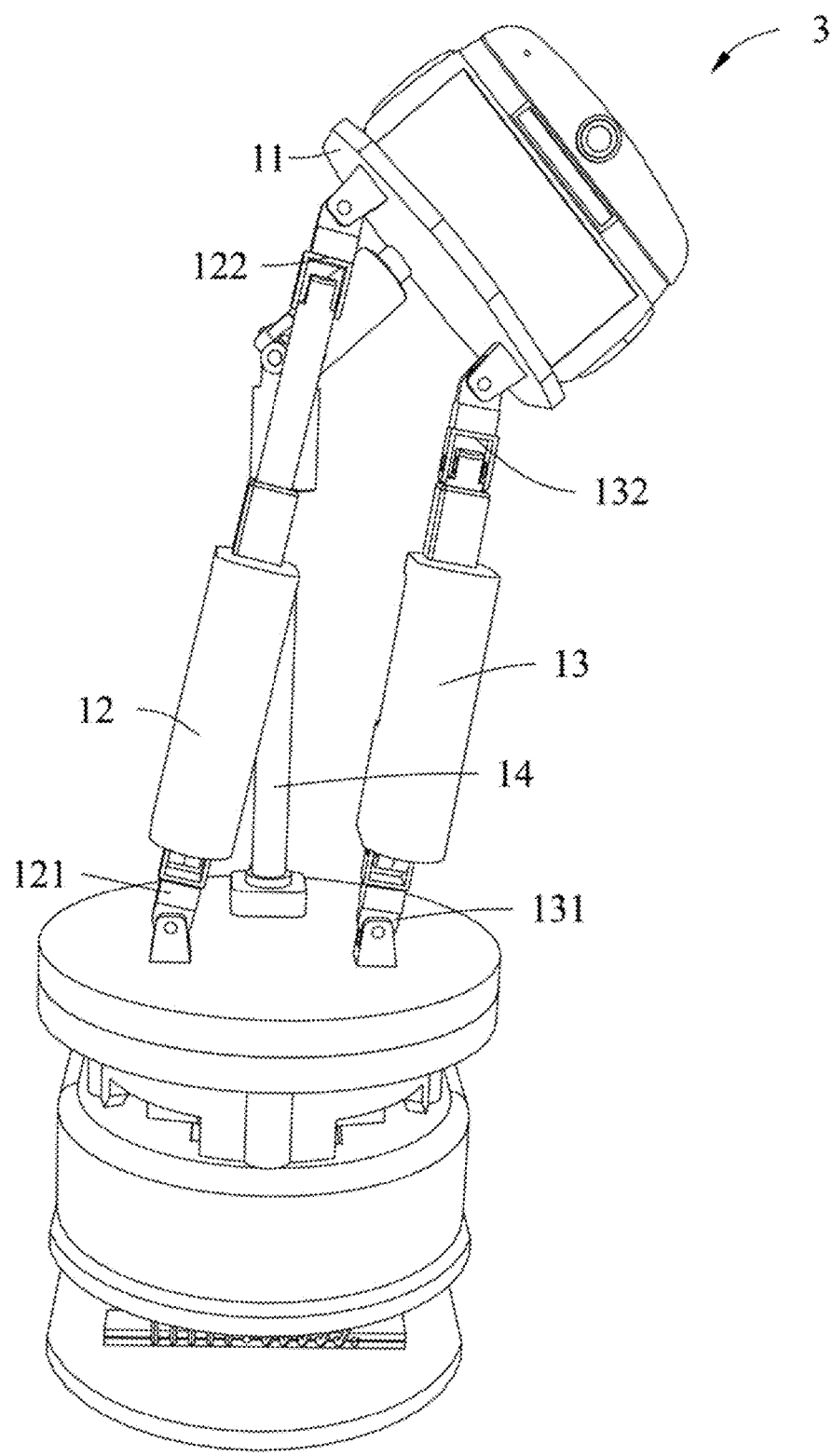
FIG. 4C is a front view of the neck mechanism according to one embodiment of the present disclosure where the roll angle of the upper platform is −50 degrees.

FIGS. 4A-4C are schematic diagrams showing specific angles of the neck mechanism 1 on a roll axis. In one embodiment, the first linear actuator 12 and the second actuator 13 are controlled to retract or extend for a same length in opposite directions to have different lengths from each other to roll the upper platform 11 to realize a roll DOF of the neck mechanism 1 for the robot 2. Specifically, as shown in FIG. 4A, the roll angle of the neck mechanism 1 for the robot 2 is 0 degrees. In the embodiment, a rotation angle of the support shaft 14 is 0 degrees, and the shaft of the first linear actuator 12 and the shaft of the second linear actuator 13 are controlled to make the first linear actuator 12 and the second linear actuator 13 have a same length as the support shaft 14, and therefore, the roll angle of the upper platform 11 is 0 degrees. In this example, the head 3 appears to be looking forward. As shown in FIG. 4B, the pitch angle of the neck mechanism 1 for the robot 2 is −50 degrees. In the embodiment, a stroke of the first linear actuator 12 is controlled to retract at a first stroke length to have the first linear actuator 12 have a height lower than height of the support shaft 14. And a stroke of the second linear actuator 13 is controlled to extend at the first stroke length to have the second linear actuator 13 have a height higher than height of the support shaft 14. In this example, the head 3 appears to be tilting to one side. As shown in FIG. 4C, the roll angle of the neck mechanism 1 for the robot 2 is 50 degrees. In the embodiment, the stroke of the first linear actuator 12 is controlled to extend at a first stroke length to have the first linear actuator 12 have a height higher than the support shaft 14. And the stroke of the second linear actuator 13 is controlled to retract at second stroke length to make the first linear actuator 123 have a height lower than height of the support shaft 14, where the second stroke length is different from the first stroke length. In this example, the head 3 appears to be tilting to an opposite side. In the embodiment, the shaft of the first linear actuator 12 is controlled to move a same length as the shaft of the second linear actuator 13 but in opposite directions without affecting a pitch angle of the upper platform 11. And in cooperation with the support shaft 14, the roll DOF of the neck mechanism 2 for the robot 3 is realized. It should be appreciated that these angles are merely exemplary and greater or lesser angles may be used for anthropomorphic movement.

Figure 4D:
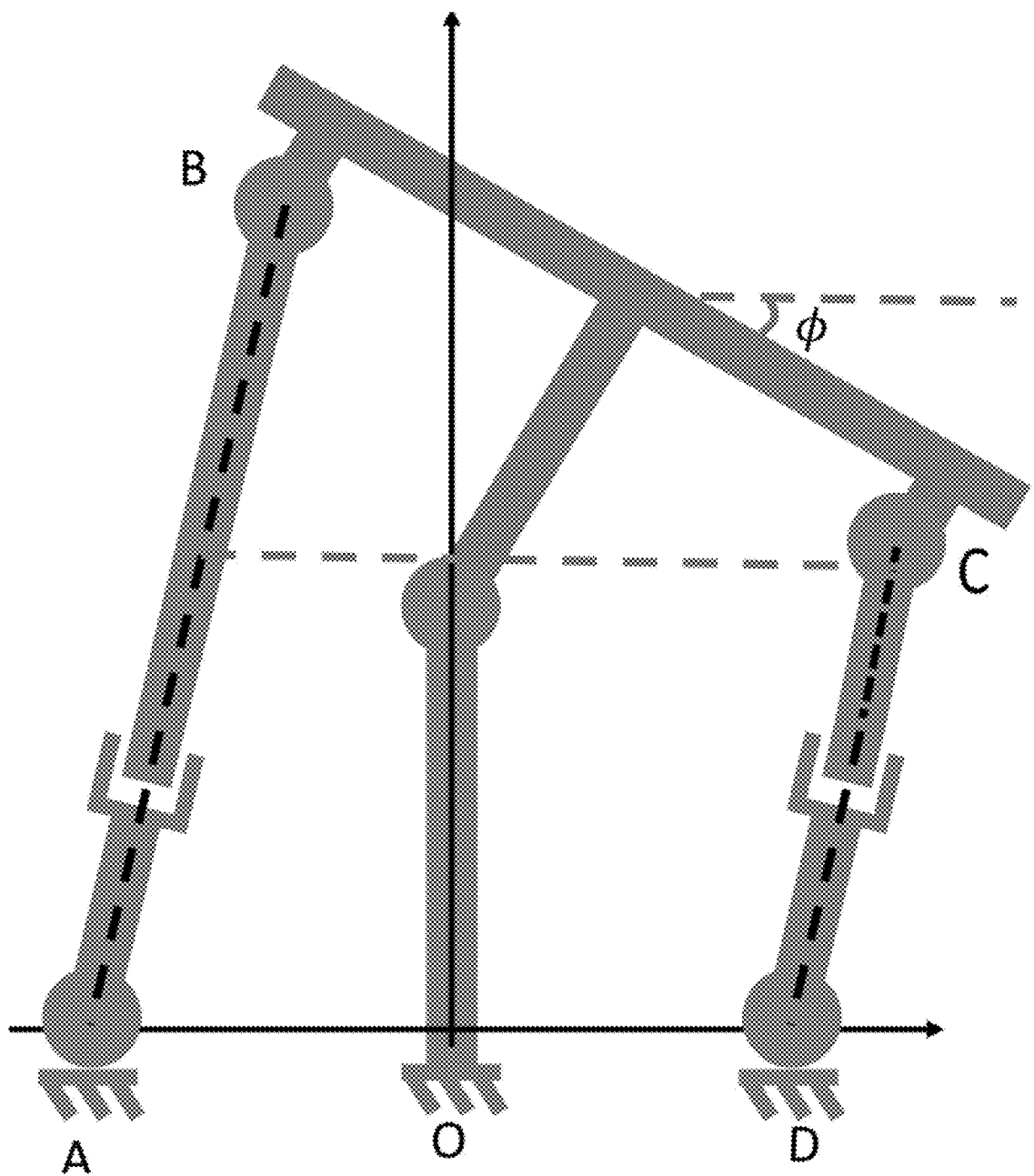
FIG. 4D is an analytical model of the neck mechanism in a roll axis according to one embodiment of the present disclosure.

In order to calculate the functional relationship between the roll angle of the upper platform 11 and the support shaft 14, the first linear actuator 12, and the second linear actuator 13, as shown in FIG. 4D, the present disclosure provides a forward kinematics analytical model to compute a roll angle of the neck mechanism 1 for the robot 2 on the roll axis.

FIG. 4D is a roll analytical model, showing the relationship between the support shaft 14, the first linear actuator 12, and the second linear actuator 13. As shown in FIG. 4D, $l_{CD}$ represents a distance of the fourth joint 132 to the rotary stage 15 in the 2D projection, $l_{AD}$ represents a distance between the first joint 121 and the third joint 131, and BE represents a distance between the axis of the second joint 122 and an axis of the fourth joint 132. Let y represent a length difference between $l_{AB}$ and $l_{CD}$. Namely, y depends on the AB and ED, and y is calculated as following:

$$y=l_{AB}-l_{CD}$$

$\phi$ represents the roll angle of the neck mechanism 1 for the robot 2, $\phi$ is calculated as:

$$\phi = \cos^{-1}\left(\frac{l_{AD}^2 + l_{BC}^2 - y^2}{2l_{AD}*l_{BC}}\right)$$

Once again, the value of $\phi$ is easy to derive and compute. Therefore, the neck mechanism 1 of the present disclosure avoids complicated forward kinematics analysis of parallel neck mechanisms, which often involves an n-th (e.g., 16) degree polynomial to solve, which mathematically, can lead to multiple solutions and angles. Of course, it should be known that in solving polynomial equations often results in two or more solutions for the same equation.

In the pitch and roll forward kinematics analytical models, $1_{CA}$, $1_{CB}$, $1_{CO}$, $1_{OA}$ are adjustable constants. In one embodiment, the lengths of $1_{AB}$ or the length of $1_{CD}$ can range from 105 mm-155 mm. Of course, the present disclosure is not limited thereto.

Based on the forward kinematic analysis models, the relationship between the pitch angle or the roll angle and positions of the first linear actuator 12 and the second linear actuator 13 is established. The inverse kinematic analysis aims to compute positions of the rotary motor 16, the first linear actuator 12 and the second linear actuator 13 as a function of three angles defined by user input. One method for computing the positions of the rotary motor 16, the first linear actuator 12 and the second linear actuator 13 is described below.

In one embodiment, the neck mechanism 1 for the robot 2 is controlled to yaw, pitch and roll in a range of 0-180 degrees (−90 to 90 degree during computation). An angle in vector form [θ, φ, ψ] is given to represent the pitch, roll, and yaw angles of the neck mechanism 1 for the robot 2, while $[S_l, S_r, R_{base}]$ represent corresponding stroke lengths of the first linear actuator 12, the second linear actuator 13, and the angular position of the rotary motor 16.

In the inverse kinematic analysis of the neck mechanism 1, the inverse kinematic analysis on the yaw axis is simple and directly depends on rotation of the rotary motor 16. Thus $R_{base}$ is calculated as:

$$R_{base} = 180 * \frac{\psi}{\pi}$$

In the inverse kinematic analysis of the neck mechanism 1 on the pitch axis only, $S_l$, $S_r$ depend on an actual length of any one of the first linear actuator 12 and the second linear actuator 13, which can be defined as $l_{AB}$, which is calculated as:

$$l_{AB} = \frac{S_l}{180} * a + l_{RL}$$

In one embodiment, as shown in FIG. 3D, $l_{AB}$ is the length of AB, which is the distance of the axis of the second joint 122 of the first linear actuator 12 to the rotary stage 16. Thus, $S_l$, $S_r$ are calculated as:

$$S_l, S_r = \frac{180}{a} * \left\{ \sqrt{l_{AB}^2} - l_{RL} \right\}$$

where $$l_{AB}^2 = l_{CB}^2 + l_{CA}^2 - 2l_{CB} * l_{CA} * \cos\left[\theta - a\tan2(l_{OA}, l_{OC}) + \frac{\pi}{2}\right]$$

Where 'a' represents a stroke length of any one of the first linear actuator 12 and the second linear actuator 13, and $l_{RL}$ represents a retracted length of any one of the first linear actuator 12 and the second linear actuator 13.

in the inverse kinematic analysis of the neck mechanism 1 on the roll axis only, as shown in FIG. 4D, y depends on both AB and ED. Because $S_l$, $S_r$ determine the lengths of AB and CD, y is calculated as follows:

$$S_l(t+1) = S_l(t) - \frac{y}{2}$$

-continued $$S_r(t+1) = S_r(t) + \frac{y}{2}$$

Where $$y = \frac{180}{a} * \sqrt{l_{AD}^2 + l_{BC}^2 - 2l_{AD} * l_{BC} * \cos(\phi)}$$

Therefore, the inverse kinematic analysis of 3DFs of the neck mechanism 1 shows an inverse relationship between variables. In one embodiment, lengths of measured or geometrically computed constants are listed in the following table:

| Stroke Length of Linear Actuator(s) | |
|---|---|
| a | 50 mm |
| Constants in pitch angle analysis | |
| $l_{CA}$ | 114.2 mm |
| $l_{OA}$ | 45 mm |
| $l_{OC}$ | 105 mm |
| $l_{CB}$ | 47.4 mm |
| $l_{RL}$ (retracted length) | 105 mm |
| Constants in roll angle analysis | |
| $l_{AD}$ | 52 mm |
| $l_{BC}$ | 52 mm |

These lengths are just provided as an example and not intended to be limiting. It may be appreciated that different lengths can be used depending on load, size, angle, and angle between the support shaft 14 and the linear actuators 12, 13, or any other factors.

Figure 5:
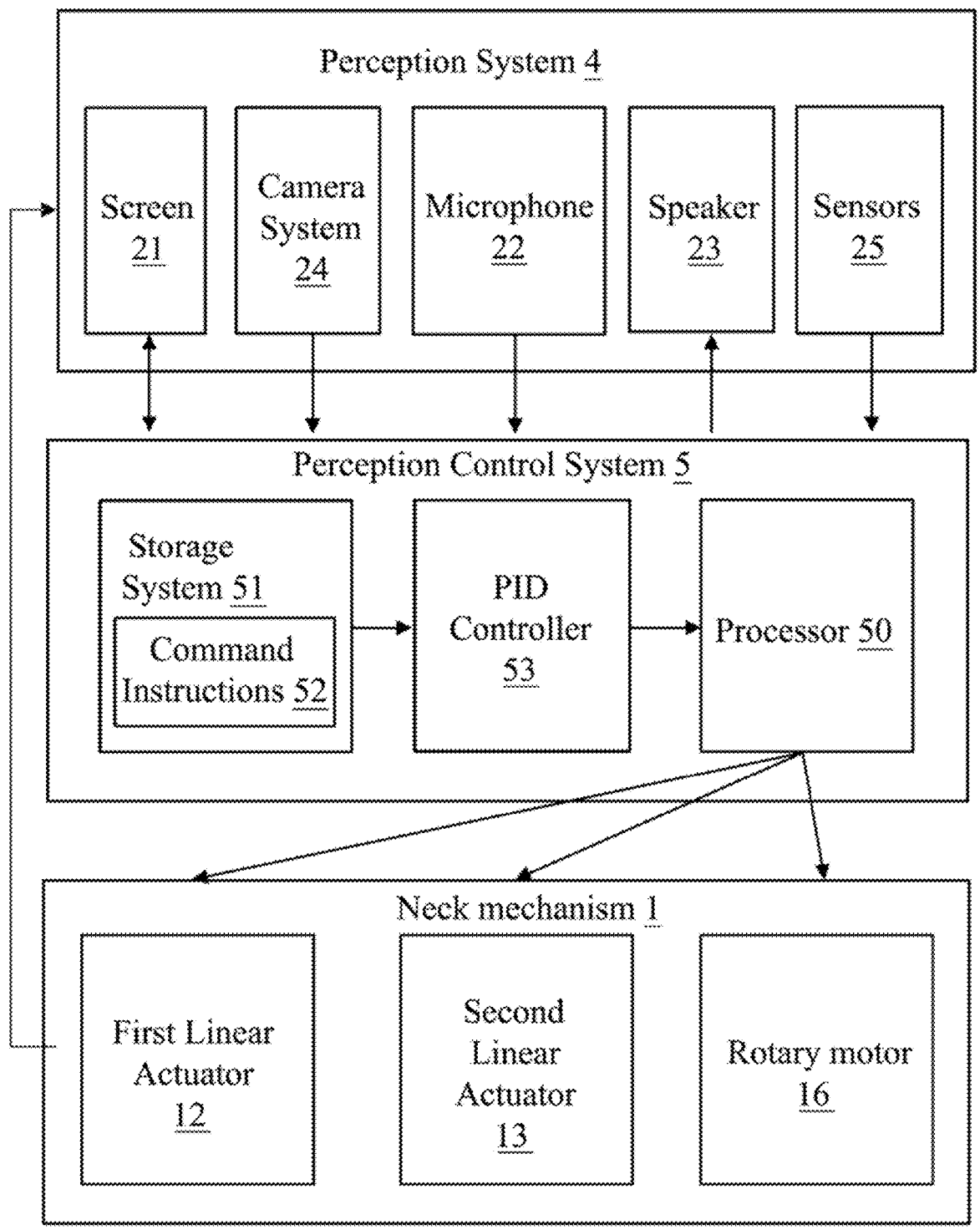
FIG. 5 is a schematic diagram of the robot including a perception control system electronically connected to the neck mechanism and other hardware and software components of the robot.

FIG. 5 is a schematic diagram of the robot 2 including the control system 5 electronically connected to the neck mechanism 1, the perception system 4, and other hardware and software components of the robot 2. The control system 5 controls movements of the first linear actuator 12, the second linear actuator 13, and the rotary motor 16.

It should be appreciated that the robot 2 is only one example of a robot, and that the robot 2 may have more or fewer components than shown, may combine two or more components, or a may have a different configuration or arrangement of the components. The various components shown in FIG. 5 may be implemented in hardware, software or a combination of both hardware and software, including one or more signal processing and/or application specific integrated circuits.

The sensor 25 is a hardware device that detects events or changes in its environment and send the information to other electronics (e.g., the control system 5). In one embodiment, the sensor 25 may include an infrared sensor, a vision sensor, a sound sensor, etc. Or, in another embodiment, the sensor 25 can use a limit switch to define the range of motion mechanically. In that case, the range of motion of the yaw rotation can be constrained by the limit switch. Pitch and roll are still defined by stroke length, and the limit switch can be configurable if smaller angles in pitch and roll DOFs are needed. However, the disclosure is not limited thereto. The sensor 25 may work in conjunction with the control system 5 or a PID controller as will be further explained bellow.

In one embodiment, the control system 5 includes a storage system 51 and a processor 50. The storage system 51 stores computerized command instructions 52 and may include high-speed random access memory and may include non-volatile memory, such as one or more magnetic disk storage devices, flash memory devices, or other non-volatile solid-state memory devices. The processor 50 executes the command instructions to control the first linear actuator 12, the second linear actuator 13, and the rotary motor 16, and interfaces with the camera system 24, and other hardware and/or software components.

The perception system 4 is a suite of hardware that allows for visual and non-visual information to be perceived, generated, and displayed. In one embodiment, the perception system 4 includes a camera system 24, the screen 21, microphone 22, the speaker 23, and the sensor 25. The camera system 24 can generate the command instructions 52 in real time in response to tracking movement of an object as will be detailed later. In other embodiments, the command instructions 52 can be received wirelessly or via a wired connection to a host computer. The microphone 22 may receive voice commands and send the voice commands to the control system 5.

In one embodiment, to track movement of the object and control the rotary motor 16, the first linear actuator 12, and the second linear actuator 13 in real-time, a position-based proportion, integral, derivative (PID) controller 53 is electronically connected with the control system 5. The PID controller 53 is configured to convert the command instructions 52 into a target yaw angle, a target pitch angle, and/or a target roll angle of the neck mechanism 1 and performs inverse kinematic calculations on a target yaw angle, a target pitch angle, and/or a target roll angle of the neck mechanism 1 to obtain a target position of the rotary motor 16, a target position of the first linear actuator 12, and a target position of the second linear actuator 13. In one embodiment, the PID controller 53 may provide an easy-adjustable graphic user interface for human-robot interaction. In one example, a real-time face/eye detector may be adopted based on the PID controller 53, thereby the head 3 is able to quickly respond to the human head poses or facial expressions for further robotic function development.

The processor 50 is configured to receive information from the PID controller 53 and control the rotary motor 16 to rotate the rotary stage 15, control the first linear actuator 12 and the second linear actuator 13 to pitch the head 3, and/or control the first linear actuator 12 and the second linear actuator 13 to roll the head 3 according to the target position of the rotary motor 16, the target position of the first linear actuator, the target position of the second linear actuator, and the PID controller 53. A detailed operation method of the control system 5 will be explained below.

In one embodiment, the control system 5 includes an ARDUINO UNO board, and the first linear actuator 12 and the rotary motor 16, second linear actuator 13 are connected with the board through wires and controlled by the board. In one embodiment, the command instructions 52 may be written in an object oriented programming language such as JAVA, PYTHON, C++, or the like. For example, when the command instructions 52 are written in PYTHON, since the range of angles is 0-180 degrees for the rotary motor 16, and 0-50 mm for the two linear actuators (which are linear servos) the angular or transitional ranges are both controlled by pulse-width modulation (PWM) signals by dialing in integer numbers ranging from 0-180 representing 0-180 degrees for the rotary motor and 0-50 mm for the linear servos. The control signal (3 numbers) are encoded as a byte data in a format of "000000000" (9 digits), where every three digits are parsed to an angular value by the processor 50. For example, assuming the yaw angle for the rotary motor is set to 30 degrees, the stroke length for the actuator 12 is set to 25 mm (the command integer is 90), and the stroke length for the actuator 13 is set to 12.5 mm (the corresponding command integer is 45), corresponding command instructions 52 are written as "030090045" and send from the host computer (software) to microcontroller. Then, the microcontroller decodes the corresponding command instructions 52 as substring ("030", "090", "045"), and finally the processor 50 decodes the substring ("030", "090", "045") into 3 number [30, 90, 45]", which represents a target rotary motor angular or linear positions of the neck mechanism 1, respectively.

Figure 6:
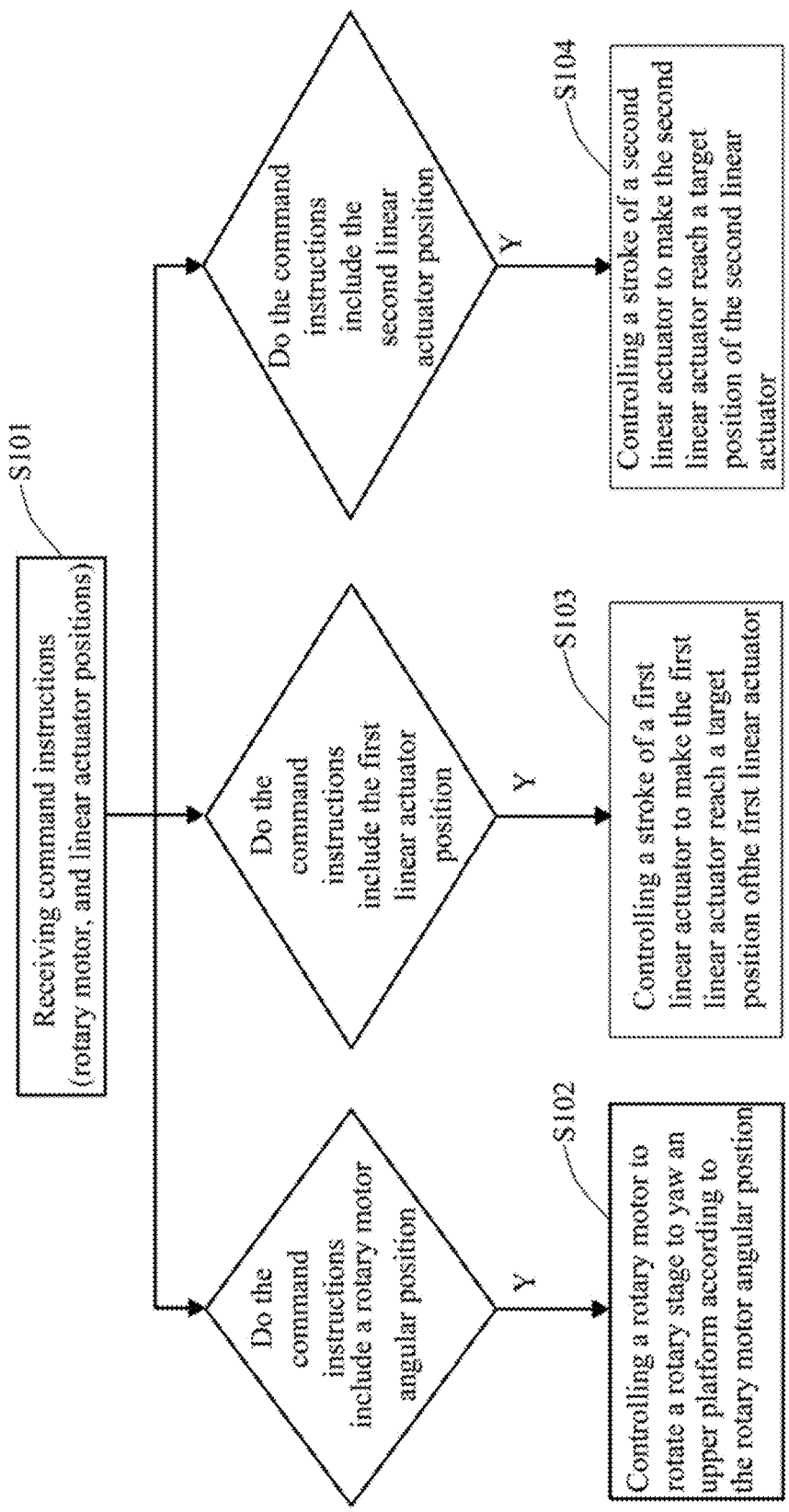
FIG. 6 is a flowchart showing a method for the perception control system to control the neck mechanism for the robot according to one embodiment of the present disclosure.

FIG. 6 is a flowchart showing a method for the control system 5 to control the neck mechanism 1 for the robot 2. As shown in FIG. 6, the method for controlling the neck mechanism 1 for the robot 2 includes following steps:

In S101, the control system 5 receives the command instructions 52. The command instructions 52 may be sent from a computer collected by the camera system 24. The camera system 24 may be disposed on the head 3 of the neck mechanism 1 for the robot 2, in one example, or positioned in other areas, such as a ceiling of a room to provide a fixed camera position, which requires more sophisticated steps to establish the perception system. In another example, the command instructions 52 may be sent by the computer wirelessly via BLUETOOTH or over a cellular network or WIFI network.

In S102, if the command instructions 52 include a target angular position of the rotary motor 16, the control system 5 controls the rotary motor 16 to rotate a rotary stage to yaw an upper platform according to the target angular position of the rotary motor 16. The yaw angle of the head 3 is controlled by the rotary motor 16, thus, the inverse kinematic analysis on the yaw axis is quite easy.

In S103, if the command instructions include a target position of the first linear actuator 12, the control system 5 controls a stroke of the first linear actuator 12 to extend or extract to reach a target position of the first linear actuator.

In S104, if the command instructions include a target position of the second linear actuator 13, the control system 5 controls a stroke of the second linear actuator 13 to extend or extract to reach a target position of the second linear actuator 13.

In one embodiment, the control system 5 controls a shaft of the first linear actuator 12 and a shaft of the second linear actuator 13 to extend or retract synchronously to have a same stroke length and move together, and controls the second joint 122 of the first linear actuator and the fourth joint 132 of the second linear actuator 14 to rotate at a same angle, and then, with cooperation of the support shaft 14, pitch the upper platform 11 according to the pitch angle.

In one embodiment, when the shaft of the first linear actuator and the shaft of the second linear actuator are extended to a middle of the stroke length, the first linear actuator and the second linear actuator have a same length as the support shaft 14, and the position of the neck mechanism now is defined as a default position. In response to the roll angle, the control system 5 controls the shaft of the first linear actuator 12 and the shaft of the second linear actuator 13 to move in the opposite directions at the same speed with respect to the default position, such that the lengths of the first linear actuator 11 and the second actuator 13 are different from each other, and then, with cooperation of the support shaft 14, to roll the upper platform 11 according to the roll angle. In one embodiment, when the shaft of the first linear actuator and the shaft of the second linear actuator are extended to a middle of the stroke length, the first linear actuator and the second linear actuator have a same length as the support shaft 14, and the position of the neck mechanism now is defined as a default position. In response to the roll angle, the control system 5 controls the shaft of the first linear actuator 12 and the shaft of the second linear actuator 13 to move in the opposite directions at the same speed with respect to the default position, such that the lengths of the first linear actuator 11 and the second actuator 13 are different from each other, and then, with cooperation of the support shaft 14, to roll the upper platform 11 according to the roll angle.

Figure 7A:
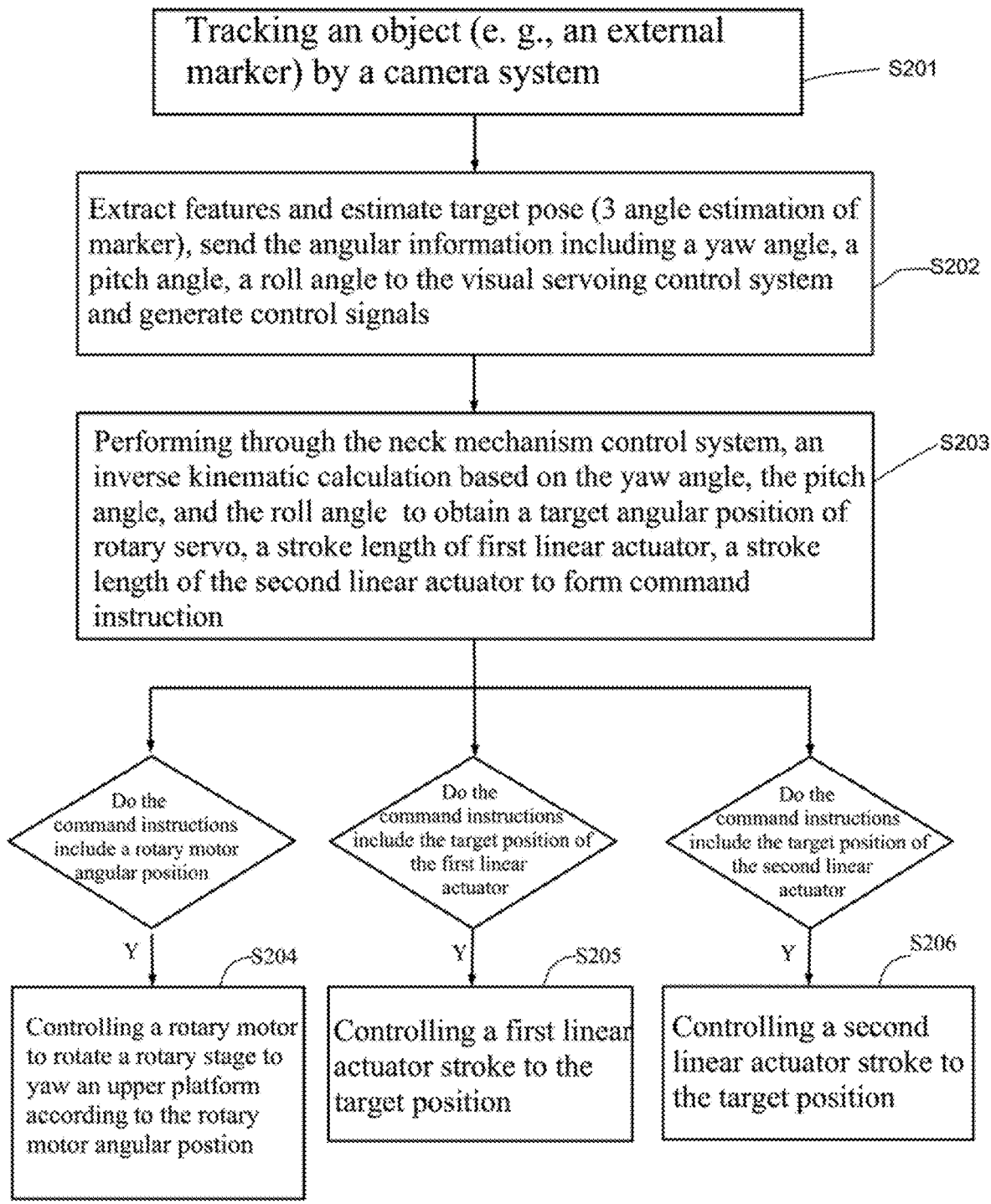
FIG. 7A is a flowchart showing a method for controlling the neck mechanism for the robot according to one embodiment of the present disclosure.

FIG. 7A is a flowchart showing a method for controlling the neck mechanism 1 for the robot 2. As shown in FIG. 7A, the method for controlling the neck mechanism 1 for the robot 2 includes following steps:

In S201, the camera system 24 tracks an object. In one embodiment, the object can be an external marker, where the external marker is a vision-based ARUCO marker (a type of 2D barcode) placed on an object for the camera system 24 to track. In one embodiment, the ARUCO marker is a 6 bit square shape, such that the ARUCO marker defines four corner points, which makes an edge length and size of the ARUCO marker can be measured. However, the present disclosure is not limited thereto, for example, the external marker could also be a face or eyes, so the neck mechanism 1 can quickly respond to the head poses of a human or facial expressions for further robotic function development.

In one embodiment, the camera system 24 may include a camera disposed on the head 3 that is capable of trucking position of the external marker in a 3D environment and capture images accordingly. Because field of view of the camera is constant, therefore, each image captured by the camera has a constant image size. Thus, an image coordinate system that includes an x-axis and a y-axis is built based on the camera, where the x-axis is a horizontal axis and the y-axis is a vertical axis. The center of the image coordinate system can be defined as (cx, cy).

In S202, the camera system 24 extracts features of the external marker, estimates a pose of the external marker, and sends angular information including a yaw angle, a pitch angle, and a roll angle of the external marker, to a perception control system; and the perception system generates angular information.

Figure 7B:
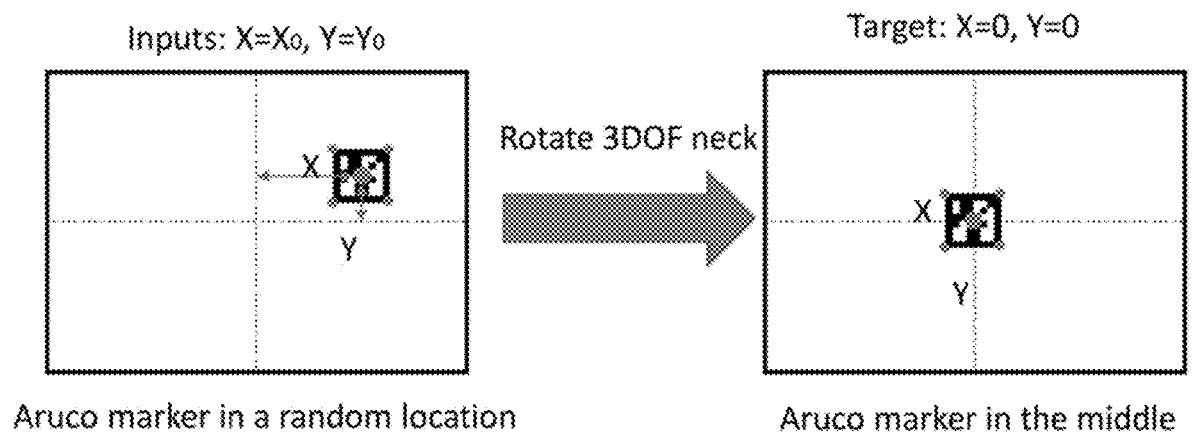
FIG. 7B is a schematic diagram showing position adjustment of the neck mechanism for the robot by using an ARUCO marker according to one embodiment of the present disclosure.

FIG. 7B is a schematic diagram showing position adjustment of the neck mechanism 1 for the robot 2 using the ARUCO marker. As shown in FIG. 7B, in one embodiment, the ARUCO marker is put in a random position within the field of view of the camera, so the image captured by the camera includes the ARUCO marker. The image including the ARUCO marker is put into the image coordinate system. Then four corners of the ARUCO marker are detected and three offset angles that includes a yaw angle, a pitch angle, and a yaw angle of the ARUCO marker are estimated through kinematic analysis. And then, the angular information including the yaw angle, the pitch angle, and the yaw angle of the ARUCO marker is sent to the perception control systems. In another example, the angular information may be sent by the computer wirelessly via BLUETOOTH or over a cellular network or WIFI network.

In S203, the control system 5 performs an inverse kinematic calculation based on the yaw angle, the pitch angle, and the roll angle to obtain a target angular position of a rotary servo, a stroke length of a first linear actuator, a stroke length of a second linear actuator to form command instruction.

The perception control system 5 compares and adjusts the yaw angle, the pitch angle and the roll angle to obtained a target yaw angle, a target pitch angle, and/or a target roll angle of the neck mechanism. Specifically, a target yaw angle, a target pitch angle, and/or a target roll angle of the neck mechanism are smaller than the yaw angle, the pitch angle and the roll angle. Then the perception control system 5 performs an inverse kinematic calculation based on the target yaw angle, the target pitch angle, and/or the target roll angle of the neck mechanism to obtain a target angular position of a rotary servo, a target position of the first linear actuator, and a target position of the second linear actuator. In the embodiment, the target position of the first linear actuator, and the target position of the second linear actuator depend on the position of the shaft of the first linear actuator and the position of the shaft of the second linear actuator. Then, command instruction including the target angular position of the rotary servo, the stroke length of the first linear actuator, the stroke length of the second linear actuator is formed.

Figure 7C:
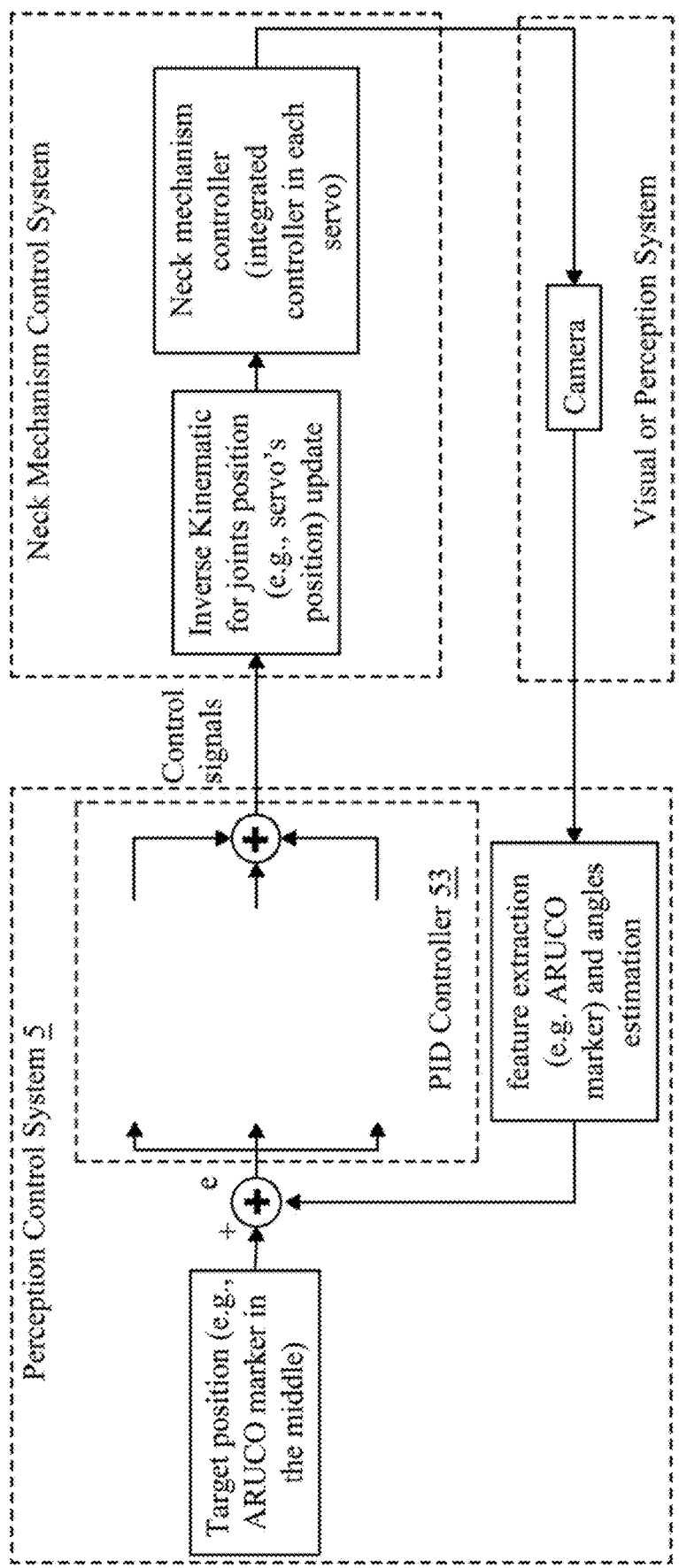
FIG. 7C is a schematic diagram showing a pipeline of the neck mechanism for the robot according to one embodiment of the present disclosure.

In one embodiment, referring to FIG. 7C, which is a schematic diagram showing a pipeline of the neck mechanism 1 for the robot 2, the yaw angle, the pitch angle, and the roll angle of the command instructions 52 are estimated through camera after detecting ARUCO marker. Then, the PID controller 53 compares and adjusts the yaw angle, the pitch angle and the roll angle to obtained the target yaw angle, the target pitch angle, and the target roll angle of the neck mechanism 1. Then, the PID controller 53 performs the inverse kinematic calculation based on the target yaw angle, the target pitch angle and/or the target roll angle of the neck mechanism 1 to calculate a target position of the rotary motor 16, a target position of the first linear actuator 12, and a target position of the first linear actuator 12, which are coded as a byte data in a format of "000000000" (9 digits), where every three digits are parsed to an position values for the rotary motor, the first linear actuator, and the second linear actuator. Based on the information calculated, as shown in FIG. 7B, the processor 50 receives the byte data and controls the rotary motor 16, the first linear actuator 12, and the second linear actuator 13 to move to the corresponding positions to make the ARUCO marker in the center of the image coordinate system.

In S204, in response to the target yaw angle being obtained, the rotary motor 16 is controlled by the control system 5 to rotate the rotary stage 15 according to the target position of the rotary motor and PID controller.

In S205, in response to the target pitch angle being obtained, the control system 5 controls the first linear actuator 12 and the second linear actuator 13 to extend or retract synchronously to have a same length and move together, and controls the second joint 122 of the first linear actuator 12 and the fourth joint 132 of the second linear actuator 13 to rotate at a same angle, and then, with cooperation of the support shaft 14, pitch the upper platform 11 according to the target position of the first linear actuator, the target position of the second linear actuator, and the PID controller.

In the embodiment, the first linear actuator 12 and the second linear actuator are in a default position before obtaining the target pitch angle where a stroke (e.g., a shaft) of the first linear actuator 12 is extended to a middle of a stroke length of the first linear actuator 12 and a stroke (e.g., a shaft) of the second linear actuator 13 is extended to a middle of a stroke length of the second linear actuator 13. At the default position, the first linear actuator 12 and the second linear actuator 13 have a same length as the support shaft 14. When the target pitch angle is obtained, the control system 5 controls the shaft of the first linear actuator 12 and the shaft of the second linear actuator 13 to extend or retract synchronously with respect to the default position along a same direction, so the first linear actuator 12 and the second linear actuator 13 have the same length that higher or lower than the support shaft 14 to pitch the upper platform 11.

And in S206, in response to the target roll angle being obtained, the control system 5 controls the first linear actuator 12 and the second linear actuator 13 to move to roll the upper platform according to the target position of the first linear actuator 12, the target position of the second linear actuator 13, and the PID controller 54, where a stroke of the first linear actuator 12 and a stroke of the second linear actuator 13 are controlled to move a same length in opposite directions with respect to the default position.

In one embodiment, the shaft of the first linear actuator 12 and the shaft of the second linear actuator 13 are in the default position before receiving the target positions of the first linear actuator and the second linear actuator. When the target roll angle is obtained, the PID controller 53 sends the byte data including the target positions of the first linear actuator and the second linear actuator to the processor 50. The processor 50 controls the shaft of the first linear actuator 12 and the shaft of the second actuator 13 to move at a same speed and a same length in opposite directions with respect to the default position, so that the stroke length of the first linear actuator 12 is different from the stroke length of the second linear actuator 13, which makes length of the first linear actuator 12 differ from length of the second linear actuator 13. And then, with cooperation of the support shaft 14, the first linear actuator 12 and the second linear actuator 13 roll the upper platform 11 according to the target roll angle.

Furthermore, since the movement of the head 3 on the yaw axis only depends on the rotary motor 16, and a resolution of the rotary motor 16, which is directly determined by the rotary motor 16, is 0.12 degree based on specification of the rotary motor, there is no need to measure the output yaw angles for calibration.

In one embodiment, in order to achieve anthropomorphic movement of the neck mechanism 1 for the robot 2 on the yaw, the pitch, and the roll axes, the yaw angle of the neck mechanism 1 may be controlled between 90 degrees and −90 degrees, the pitch angle of the neck mechanism 1 may be controlled between 30 degrees and −30 degrees, and the roll angle of the neck mechanism 1 may be controlled between 50 degrees and −50 degrees Specifically, the PID controller 53 is configured to achieve smooth and dynamic control of head 3 and avoid overshot of head movement. The PID controller 53 is set to minimize latency between image processing and servo control. However, the movement of the head 3 on the yaw axis depends on the rotary motor 16 only, and the control of the rotary motor 16 is simple and accurate, so need to measure and control error of the movement of the rotary motor 16 is minimal. Specifically, in one embodiment, PID parameters are set different for yaw angle from roll and pitch.

Figure 7D:
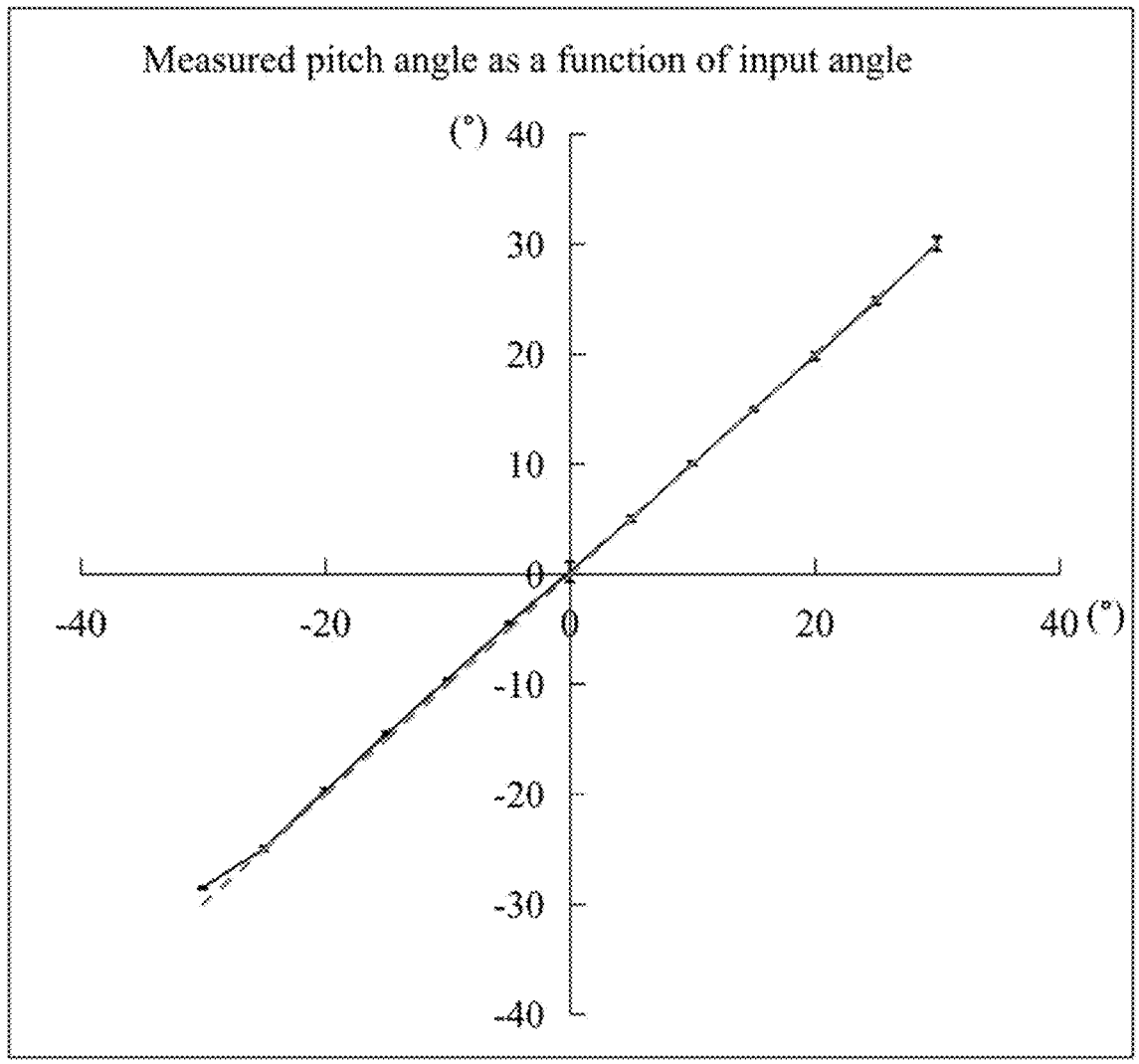
FIG. 7D shows a graph relationship between measured pitch angles and input pitch angles of the neck mechanism on the pitch axis.
Figure 7E:
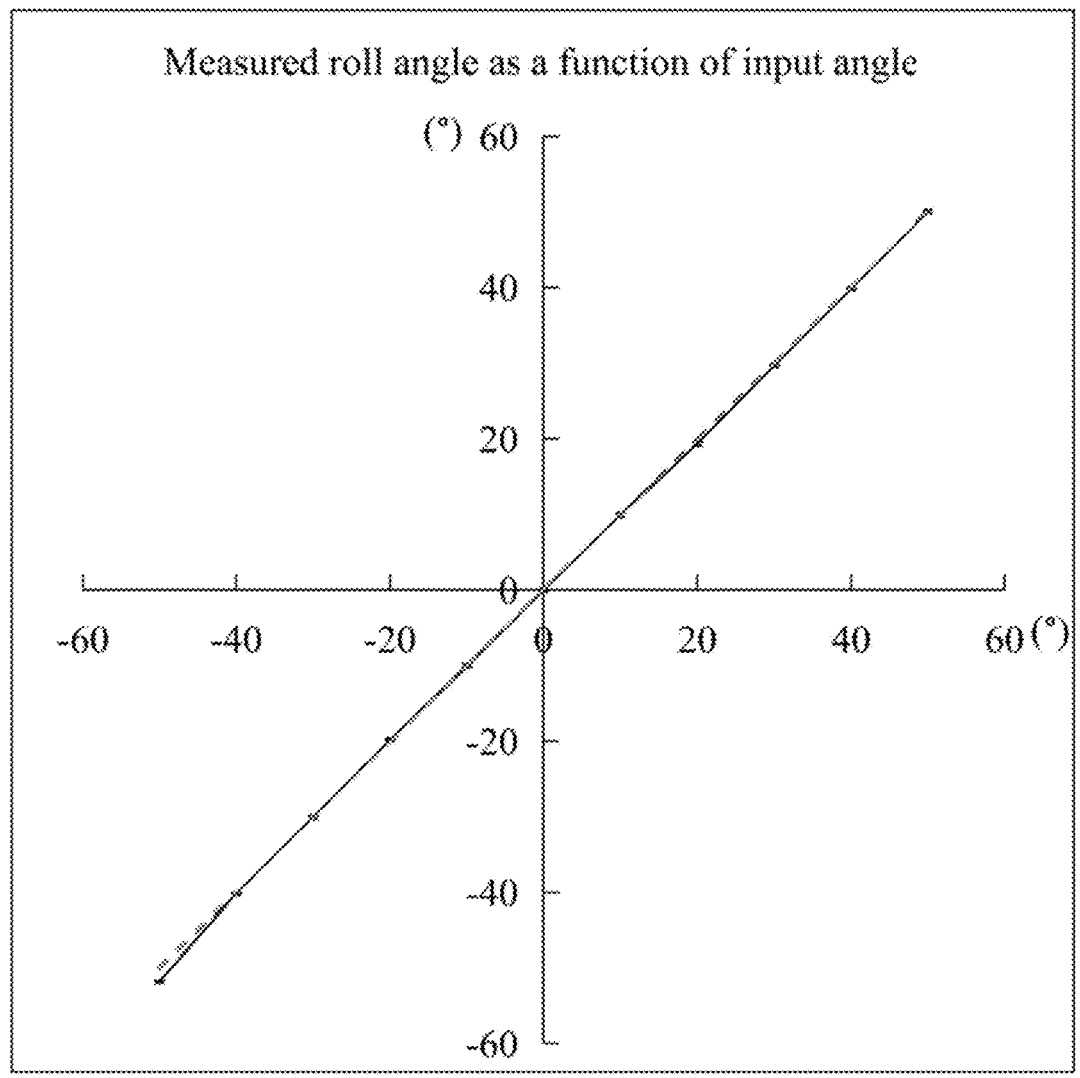
FIG. 7E shows a graph relationship between measured roll angles and input roll angles of the neck mechanism on the yaw axis.

As a result, with reference to FIG. 7D, error between the input pitch angles and the measured pitch angles is small and negligible as can be seen from FIG. 7D which shows a graph relationship between measured pitch angles and input pitch angles of the neck mechanism 1 on the pitch axis, where the dashed line represent the input pitch angles based on the inverse kinematic calculation and the solid line that is aligned with the dashed line represents the measured pitch angles. And with reference to FIG. 7E, the graph indicates that an error between the input roll angles and the measured toll angles to be small and negligible, as FIG. 7E shows a graph relationship between measured roll angles and input roll angles of the neck mechanism 1 on the roll axis, where the dashed line represent the input roll angles based on the inverse kinematic calculation and the solid line that is aligned with the dashed line represents the measured roll angles. As can be seen from both FIGS. 7D and 7E, there is a direct and positive linear correlation between pitch and roll angles to the inverse kinematic equations.

Figure 8A:
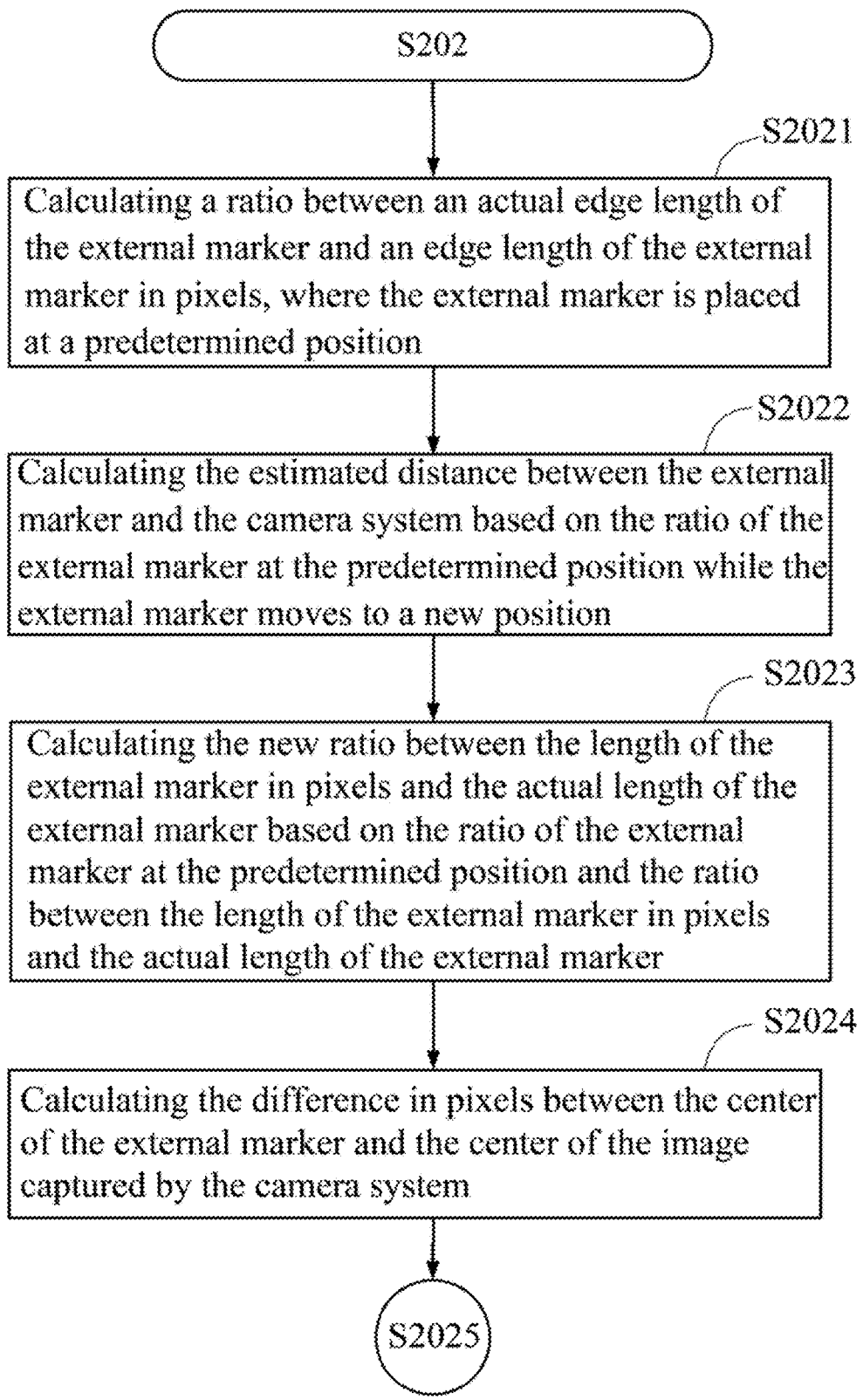
FIGS. 8A and 8B are flowcharts showing a method for calculating a yaw angle, a pitch angle, and a roll angle in command instructions according to one embodiment of the present disclosure.
Figure 8B:
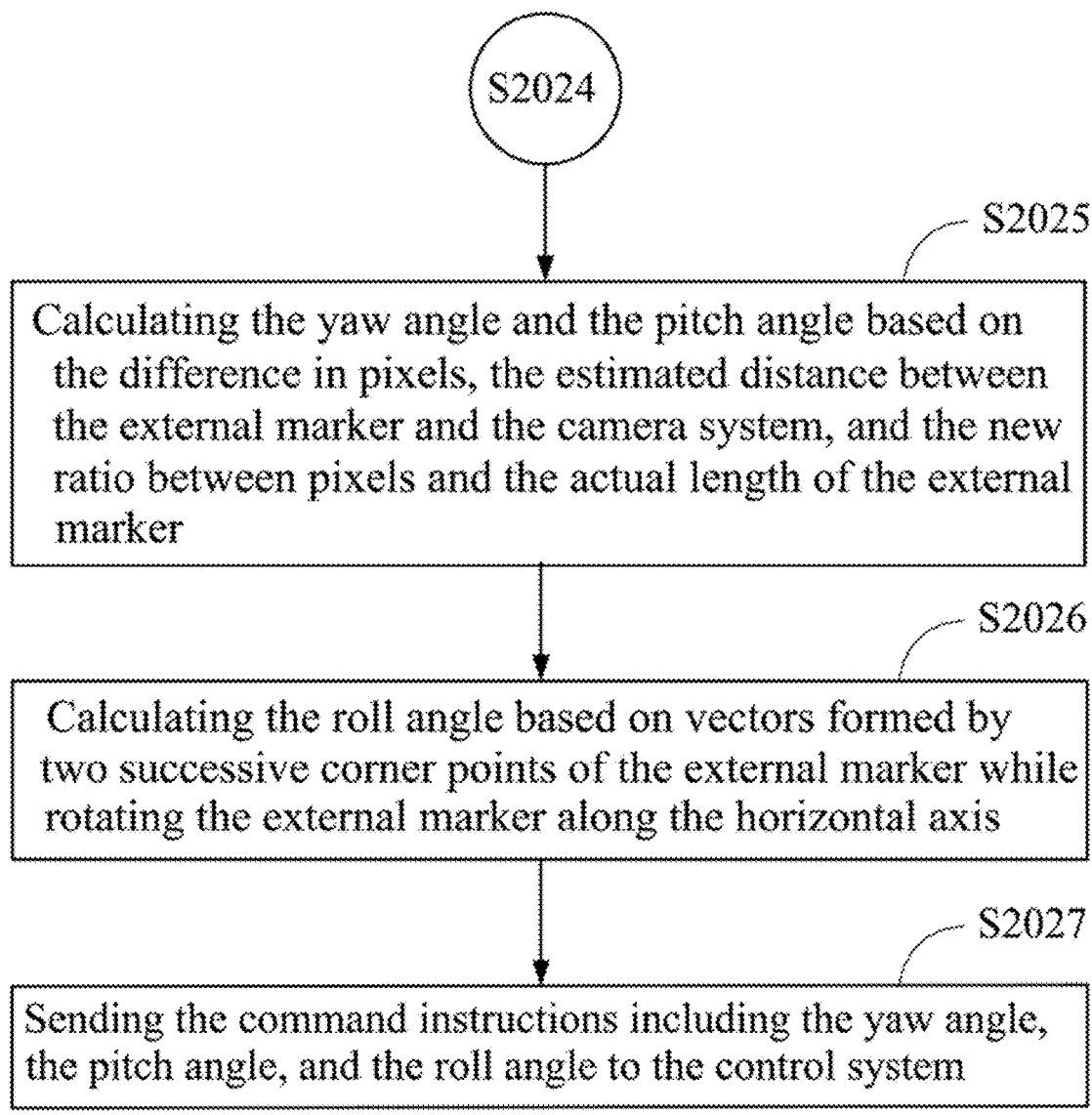

FIGS. 8A and 8B are flowcharts showing a method for calculating the yaw angle, the pitch angle, and the roll angle in the command instructions. The method for calculating the yaw angle, the pitch angle, and the roll angle in the command instructions includes following steps:

In S2021, a ratio between an actual edge length of the external marker and an edge length of the external marker in image is calculated, where the external marker is placed at a predetermined position and in perpendicular to the camera's axis;

To represent the external marker, in one embodiment, an ARUCO marker with 6*6 bits can be printed on an A4 paper with the actual edge length measured by inches is 1.83 inches. When the ARUCO marker is placed at a predetermined position, the ARUCO marker in the images occupied a constant value of pixels. For example, the ARUCO marker contains 27 pixels in the image when the ARUCO marker is put at D0=1295.4 mm, where the D0 is a distance between the camera and the ARUCO marker, and the ratio between the actual edge length of the ARUCO marker and the edge length of the ARUCO marker in pixels is:

$$\text{ratio}_{offset} = \frac{1.83 \text{ inch}}{27 \text{ pixel}} = 0.0678 \text{ inch/pixel};$$

where the ratio$_{offset}$ represents the ratio between the actual edge length of the ARUCO marker and the edge length of the ARUCO marker in pixels when $D_0$ is 12954 mm.

In S2022, the estimated distance between the external marker and the camera system 24b is calculated based on the ratio of the external marker at the predetermined position and a pose while the external marker moves to a new position and/or has a new pose.

In one embodiment, an area $S_0$ of the ARUCO marker in pixels when the ARUCO marker is placed at the predetermined position is calculated by:

$$S_0 = 27 \times 27 = 729 \text{ pixel}^2.$$

Assuming the ARUCO marker is moved back and forth (still perpendicular to the camera axis), the ratio between the edge length of the ARUCO marker in pixels at the predetermined position and pose and the edge length of the ARUCO marker in pixels at the new position and pose is computed as:

$$\text{ratio}_{dist} = S_{aruco}/S_0,$$

where the $S_{aruco}$ represents an area of the ARUCO marker in pixels at the new position.

So, when the ARUCO marker is moved to the new position and pose, the estimated distance between ARUCO marker and the camera system is calculated as follow:

$$D_{aruco} = \frac{D_0}{\text{ratio}_{dist}},$$

where the $D_{aruco}$ is the estimated distance between the external marker placed at the new position and pose and the camera system.

In S2023, a new ratio between the edge length of the external marker in pixels at the new position and pose and the actual length of the external marker is calculated based on the ratio of the external marker at the predetermined position and pose and the ratio between the length of the external marker in pixels and the actual length of the external marker.

In one embodiment, the new ratio between the edge length of the external marker in pixels at the new position and pose and the actual length of the external marker is calculated by:

$$ratio_{all} = ratio_{dist} * ratio_{offset},$$

where the $ratio_{all}$ is the new ratio between the edge length of the ARUCO marker in pixels at the new position and pose and the actual length of the ARUCO marker.

In S2024, the difference in pixels between the center of the external marker and the center of the image captured by the camera system is calculated.

After obtaining the distance between the ARUCO marker and the camera system 24, the offset between the ARUCO marker and the center of the image is computed. When the image is placed in the image coordinate system, the center of the image is defined as (cx, cy). For example, in one embodiment, as shown in FIG. 7B, assuming an image size of the images captured by the camera system is 640×480 (pixels), thus, when the image is placed in the image coordinate system, the center of the image is (320, 240). Therefore, the offset in x-axis and y-axis are:

$$\begin{cases} x_{offset} = 320 - c_x \\ y_{offset} = 240 - c_y \end{cases}$$

Of course, the image size of the images depends on different types of cameras, which are not limited thereto.

Figure 9A:
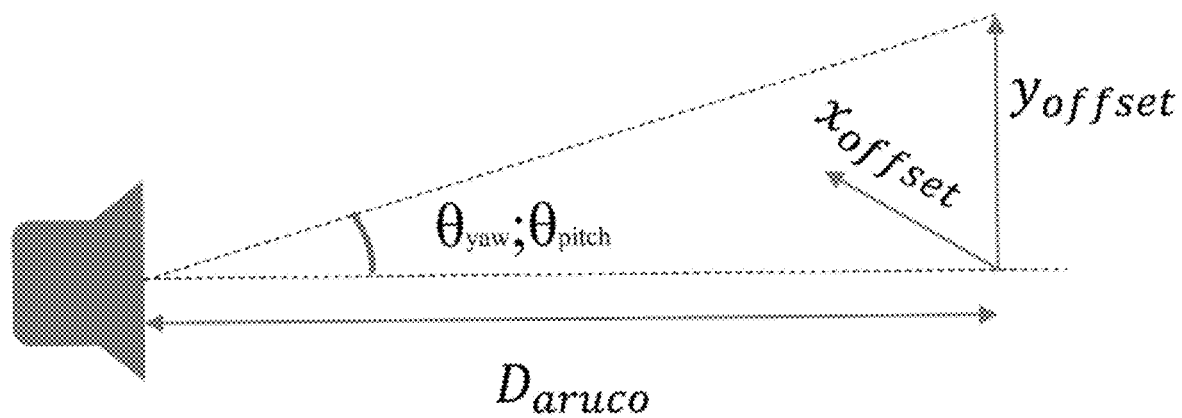
FIG. 9A is an analysis model showing an estimation of the yaw angle and the pitch angles of the command instructions according to one embodiment of the present disclosure.

In S2025, the yaw angle and the pitch angle are calculated based on the difference in pixels along x-axis and y-axis, the estimated distance between the external marker and the camera system, and the new ratio between pixels and the actual length of the external marker;

In one embodiment, with referring to FIG. 9A, which is an analysis model showing an estimation of the yaw and pitch angles of the ARUCO marker, after obtaining the offset of the ARUCO marker in the image coordinate system, the yaw angle and the pitch angle of the ARUCO marker is calculated by:

$$\theta_{pitch} = y_{offset} * \frac{ratio_{all}}{D_{aruco}}$$

and $$\theta_{yaw} = x_{offset} * \frac{ratio_{all}}{D_{aruco}}$$

where $\theta_{yaw}$ represents the yaw angle of the ARUCO marker, and $\theta_{pitch}$ represents the pitch angle of the ARUCO marker.

In S2026, the roll angle is calculated based on a function of the external marker rotating along a horizontal axis. In one embodiment, the function is according to vectors formed by two successive corner points of the external marker while rotating the external marker along the horizontal axis.

Figure 9B:
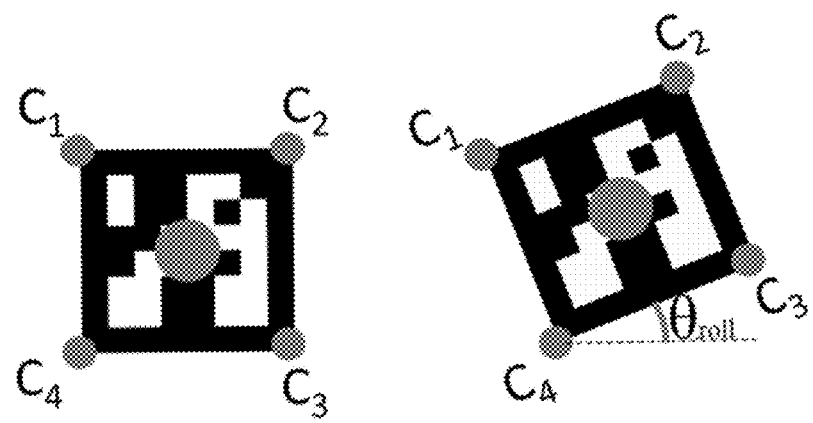
FIG. 9B is an analysis model showing an estimation of the roll angle of the command instructions according to one embodiment of the present disclosure.

FIG. 9B is an analysis model showing an estimation of the roll angle of the ARUCO marker. As shown in FIG. 9B, in one embodiment, the ARUCO marker is rotated by $\phi$ degrees, and the ARUCO marker defines four corners C1, C2, C3, and C4 in the image.

$$\theta_{roll} = a \tan 2(c_{1y} - c_{2y}, c_{1x} - c_{2x})$$

where the $\theta_{roll}$ represents the roll angle of the ARUCO marker. Thus, the yaw, pitch, and roll angles of the ARUCO marker are computed and converted into command instructions.

In S2027, the camera system 24 sends the command instructions including the yaw angle, the pitch angle, and the roll angle to the control system 5.

After the yaw, pitch, and roll angles of the ARUCO marker are estimated by the camera system 24 and sent back to the control system 5, the rotary motor 16, the first linear actuator 12, and the second linear actuator 13 guide the head 3 (e.g., the upper platform 11) to move towards the ARUCO marker to make sure the ARUCO marker is located in the center of the image.

It should be understood that the angle information derived from images is incremental based on a current frame. The original angle is set as a certain value as a starting position. After that, every estimation of the new angle will be accumulated as a current angle of the neck mechanism 1. For example, the relationship of angle change can be expressed as:

$$\theta[t+1] = \theta[t] + PID(\theta[t]), \theta \in \{\theta_{yaw}, \theta_{pitch}, \theta_{roll}\}$$

Where A(t−1) represents a last angle of the neck mechanism 1 and PID(θ) represents a target angle of the neck mechanism 1, where PID(θ) can be expressed as:

$$PID(\theta) = k_p * e + k_i * \int_0^t e(\tau)d\tau + k_d * \frac{d}{dt}e(t)$$

In one embodiment, $k_p$, $k_i$, $k_d$ can set as 0.12, 0.01, 0.0, respectively which gives smooth motion of the head 3 during real-time marker tracking. In one example, pseudo code can be written as follows:

| Algorithm 1 Visual Algorithm for Motion Control |
| --- |
| 1:  initial $e_p[0] = 0$, $e_i[0] = 0$, $e_d[0] = 0$, $\theta[0] = \theta_0$, t = 0, |
| 2:  PID control was apply to pitch,roll,yaw,respectively. |
| 3:  while true do |
| 4:     t = t + 1 |
| 5:     makerinfo = DetectArUco( ) |
| 6:     θ[t] = ComputeAngles(makerinfo) |
| 7:     $e_p[t + 1] = 0 - \theta[t]$ |
| 8:     $e_d[t + 1] = e_p[t + 1] - e_p[t]$ |
| 9:     $e_i[t + 1] = \Sigma_{n=1}^{N} err_p$ |
| 10:   PID(θ[t]) = $k_p * e_p[t] + k_i * e_i[t] + k_d * e_d[t]$ |
| 11:   θ[t + 1] = θ[t] + PID(θ[t]) |
| 12:   $S_l[t + 1]$, $S_r[t + 1]$, $R_b[t + 1]$ = IK(θ[t + 1]) |
| 13:   MoveMotor($S_l[t + 1]$, $S_r[t +1]$, $R_b[t + 1]$) |
| 14: end while |

It should be appreciated the above disclosure detailed several embodiments of the neck mechanism for a robot. The neck mechanism can be employed for robots that need to be appear more human-like or to have more human-like qualities. This creates a sense of trust and connection and can act as a friend in need. Thus, the neck mechanism of the above disclosure can be used in schools, offices, or healthcare facilities, such as hospitals or elderly care facilities, but the disclosure is not limited thereto.

The basic principles, main features, and advantages of the present disclosure are shown and described above. It should be understood by those skilled in the art that the present disclosure is not limited by the foregoing embodiments. The above description of the embodiments and the description is merely illustrative of the principles of the present disclosure.

There are various variations and modifications of the present disclosure without departing from the spirit and scope of the present disclosure. The scope of the present disclosure is defined by the appended claims and their equivalents.

What is claimed is:

1. A control system for a neck mechanism comprising a rotary motor, a first linear actuator, a second linear actuator in parallel with the first line actuator, a rotary stage positioned between an upper platform and a lower platform, and a support shaft positioned behind and between the first linear actuator and the second linear actuator, wherein the first linear actuator, the second linear actuator, and the support shaft are connected between the upper platform and the lower platform, wherein the control system comprises:
   a perception system configured to track movement of an object;
   a perception control system electronically connected with the perception system and configured to compute a target position of the upper platform according to the movement, wherein a processor controls the rotary motor to rotate the rotary stage to yaw the upper platform according to the target position, and controls the first linear actuator and the second linear actuator to pitch and roll the upper platform according to the target position.

2. The control system of claim 1, wherein the perception system comprises a camera system configured to track movement of the object, wherein the upper platform is controlled to move according to a position and pose of the object.

3. The control system of claim 2, wherein the camera system is further configured to send a yaw angle, a pitch angle, and a roll angle to the perception control system to move the upper platform, wherein the yaw angle, the pitch angle, and the roll angle are calculated based on one or more images comprising the position and the pose of the object.

4. The control system of claim 3, wherein the perception control system performs an inverse kinematic calculation based on the yaw angle, the pitch angle, and/or the roll angle to obtain a target angular position of the rotary motor, a stroke length of the first linear actuator, a stroke length of the second linear actuator, controls the rotary motor to rotate the rotary stage according to the yaw angle, controls the first linear actuator and the second linear actuator to extend/retract according to the pitch angle, and controls the first linear actuator and the second linear actuator to extend/retract according to the roll angle.

5. The control system of claim 1, wherein the perception control system includes a proportional-integral-derivative controller (PID) to achieve real-time smooth control of the neck mechanism.

6. The control system of claim 1, wherein the perception control system controls both a stroke of the first linear actuator and a stroke of the second linear actuator to extend or retract to be higher or lower than a height of the support shaft to pitch the upper platform.

7. The control system of claim 1, wherein the perception control system controls a stroke of the first linear actuator and a stroke of the second linear actuator to move a same length along opposite directions with respect to a default position of the first linear actuator and the second linear actuator to roll the upper platform.

8. The control system of claim 7, wherein when in the default position, the first linear actuator and the second liner actuator have a same length as length of the support shaft.

9. The control system of claim 7, wherein when in the default position, the stroke of the first linear actuator extends to a middle of a stroke of the first linear actuator and the stroke of the second linear actuator extends to a middle of a stroke of the first linear actuator.

10. The control system of claim 2, wherein the object is an external marker and the camera system is further configured to capture the external marker in an image within a field of view of the camera system and detect four corners of the external marker in an image coordinate system.

11. The control system of claim 10, wherein the perception control system performs an inverse kinematic calculation based on the yaw angle, the pitch angle, and/or the roll angle of the external marker to move the upper platform to make the external marker in a center of the image coordinate system.

12. The control system of claim 11, wherein the pitch angle and the yaw angle are calculated according to a function of offsets of the image in the image coordinate system, a size of the external marker, and an estimated distance between the external marker and the camera system.

13. The control system of claim 11, wherein the roll angle is calculated based on a function of the external marker rotating along a horizontal axis.

14. A method of controlling movement of a neck mechanism comprising a rotary motor, a first linear actuator, a second linear actuator in parallel with the first line actuator, a rotary stage positioned between an upper platform and a lower platform, and a support shaft positioned behind and between the first linear actuator and the second linear actuator, wherein the first linear actuator, the second linear actuator, and the support shaft are connected between the upper platform and the lower platform, wherein the method comprises:
   using a camera system to capture an external marker in an image within a field of view of the camera system and detect four corners of the external marker in an image coordinate system;
   calculating a yaw angle and a pitch angle of the external marker based on a center of the external marker in the image coordinate system and a distance of the external marker;
   calculating a roll angle of the external marker based on a function of the external marker rotating along a horizontal axis;
   performing inverse kinematic calculations based on angles calculated from the external marker including the yaw angle, the pitch angle and/or the roll angle of the external marker;
   yawing the upper platform by rotating the rotary stage according to the inverse kinematic calculations; and
   pitching or rolling the upper platform by extending or retracting the first linear actuator and/or the second linear actuator according to the inverse kinematic calculations.

15. The method of controlling movement of the neck mechanism of claim 14, wherein the first linear actuator and/or the second linear actuator extend/retract according to the pitch angle and/or the roll angle.

16. The method of controlling movement of the neck mechanism of claim 14, further comprising controlling a stroke of the first linear and a stroke of the second linear actuator to extend or retract to be higher or lower than a height of the support shaft, to pitch the upper platform.

17. The method of controlling movement of the neck mechanism claim 14, further comprising controlling a stroke of the first linear actuator and a stroke of the second linear actuator to move a same length along opposite directions with respect to a default position of the first linear actuator and the second linear actuator, to roll the upper platform.

18. The method of controlling movement of the neck mechanism of claim 17, wherein when in the default position, the stroke of the first linear actuator extends to a middle of the stroke of the first linear actuator and the stroke of the second linear actuator extends to a middle of the stroke of the first linear actuator.

19. The method of controlling movement of the neck mechanism of claim 14, wherein the distance of the external marker is based on an edge length of the external marker in pixels and an actual length of the external marker.

20. The method of controlling movement of the neck mechanism of claim 14, wherein the function of the external marker rotating along the horizontal axis is based on vectors formed by two successive corner points of the external marker while rotating the external marker along the horizontal axis.

* * * * *